US008908001B2

(12) United States Patent
 Amada

(10) Patent No.: US 8,908,001 B2
(45) Date of Patent: Dec. 9, 2014

(54) OPTICAL SCANNING DEVICE AND IMAGE FORMING APPARATUS

(75) Inventor: Taku Amada, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1142 days.

(21) Appl. No.: 11/848,629

(22) Filed: Aug. 31, 2007

(65) Prior Publication Data

US 2008/0069585 A1 Mar. 20, 2008

(30) Foreign Application Priority Data

Sep. 15, 2006 (JP) .................................. 2006-250858
Mar. 12, 2007 (JP) .................................. 2007-061951

(51) Int. Cl.
| | |
|---|---|
| B41J 15/14 | (2006.01) |
| B41J 27/00 | (2006.01) |
| B41J 2/435 | (2006.01) |
| G03G 15/32 | (2006.01) |
| H04N 1/00 | (2006.01) |
| H04N 1/113 | (2006.01) |
| H04N 1/12 | (2006.01) |

(52) U.S. Cl.
CPC ......... *G03G 15/326* (2013.01); *H04N 1/00978* (2013.01); *H04N 1/1135* (2013.01); *G03G 2215/0404* (2013.01); *H04N 1/12* (2013.01); *H01N 2201/0082* (2013.01); *H04N 2201/0446* (2013.01)
USPC ........... 347/242; 347/244; 347/245; 347/257; 347/258; 347/259; 347/260; 347/263

(58) Field of Classification Search
USPC ......... 347/232, 233, 241, 242, 243, 244, 245, 347/256–261, 263
See application file for complete search history.

(56) References Cited

U.S. PATENT DOCUMENTS

| | | | |
|---|---|---|---|
| 5,952,649 | A | 9/1999 | Amada |
| 6,621,512 | B2 | 9/2003 | Nakajima et al. |
| 6,771,300 | B2 | 8/2004 | Amada et al. |
| 7,050,082 | B2 | 5/2006 | Suzuki et al. |
| 7,145,589 | B2 | 12/2006 | Amada et al. |

(Continued)

FOREIGN PATENT DOCUMENTS

| | | |
|---|---|---|
| JP | 2001-4948 | 1/2001 |
| JP | 2001-228416 | 8/2001 |

(Continued)

OTHER PUBLICATIONS

Japanese Office Action issued Nov. 8, 2011 in patent application No. 2007-061951.

*Primary Examiner* — Uyen Chau N Le
*Assistant Examiner* — John M Bedtelyon
(74) *Attorney, Agent, or Firm* — Oblon, Spivak, McCleland, Maier & Neustadt, L.L.P.

(57) ABSTRACT

An optical scanning device includes a plurality of stations, each of which includes an light source, a deflector (polygon scan), a scanning optical element, and a housing. The light source emits a light beam to a plurality of surfaces to be scanned. The deflector deflects light beams emitted from the light source. The scanning optical element scans the surfaces to be scanned with light spots of the optical beams deflected by the deflector. The housing houses therein the light source, the deflector, and the scanning optical element. The scanning optical element is secured to the housing so that directions of scanning-line curves caused by temperature change match between the surfaces to be scanned.

18 Claims, 29 Drawing Sheets

(56) References Cited

U.S. PATENT DOCUMENTS

| | | |
|---|---|---|
| 7,206,014 B2 | 4/2007 | Amada et al. |
| 2004/0032631 A1 | 2/2004 | Amada et al. |
| 2004/0036936 A1 | 2/2004 | Nakajima et al. |
| 2004/0246553 A1* | 12/2004 | Yoshizawa ............ 359/216 |
| 2005/0024479 A1 | 2/2005 | Itabashi et al. |
| 2005/0052719 A1* | 3/2005 | Tomita et al. ......... 359/205 |
| 2005/0179971 A1 | 8/2005 | Amada et al. |
| 2006/0132880 A1* | 6/2006 | Amada et al. ......... 359/196 |
| 2006/0209166 A1 | 9/2006 | Suzuki et al. |
| 2006/0232660 A1 | 10/2006 | Nakajima et al. |
| 2006/0238845 A1 | 10/2006 | Atsuumi et al. |
| 2007/0081152 A1 | 4/2007 | Amada |
| 2007/0097474 A1 | 5/2007 | Amada et al. |

FOREIGN PATENT DOCUMENTS

| | | |
|---|---|---|
| JP | 2002-131674 | 5/2002 |
| JP | 2005-10358 | 1/2005 |
| JP | 3686644 | 6/2005 |
| JP | 2005-234506 | 9/2005 |
| JP | 2005-241753 | 9/2005 |

* cited by examiner

FIG.3

| | (i) COMPONENT OF STATION M | (ii) COMPONENT OF STATION Y | (iii) COMPONENTS OF BOTH STATIONS | (iv) DEVIATION BETWEEN STATIONS (AMOUNT OF OUT OF COLOR REGISTRATION) | EPEXEGESIS |
|---|---|---|---|---|---|
| (a) | │ | │ | ‖ | — | COLOR MISREGISTRATION DOES NOT OCCUR |
| (b) | ( | ( | (( | — | COLOR MISREGISTRATION DOES NOT OCCUR |
| (c) | ( | ( | ( ) | ‿ | NO COLOR MISREGISTRATION IS PRESENT |
| (d) | ( | ( | (( | ⌒ | COLOR MISREGISTRATION OCCURS |

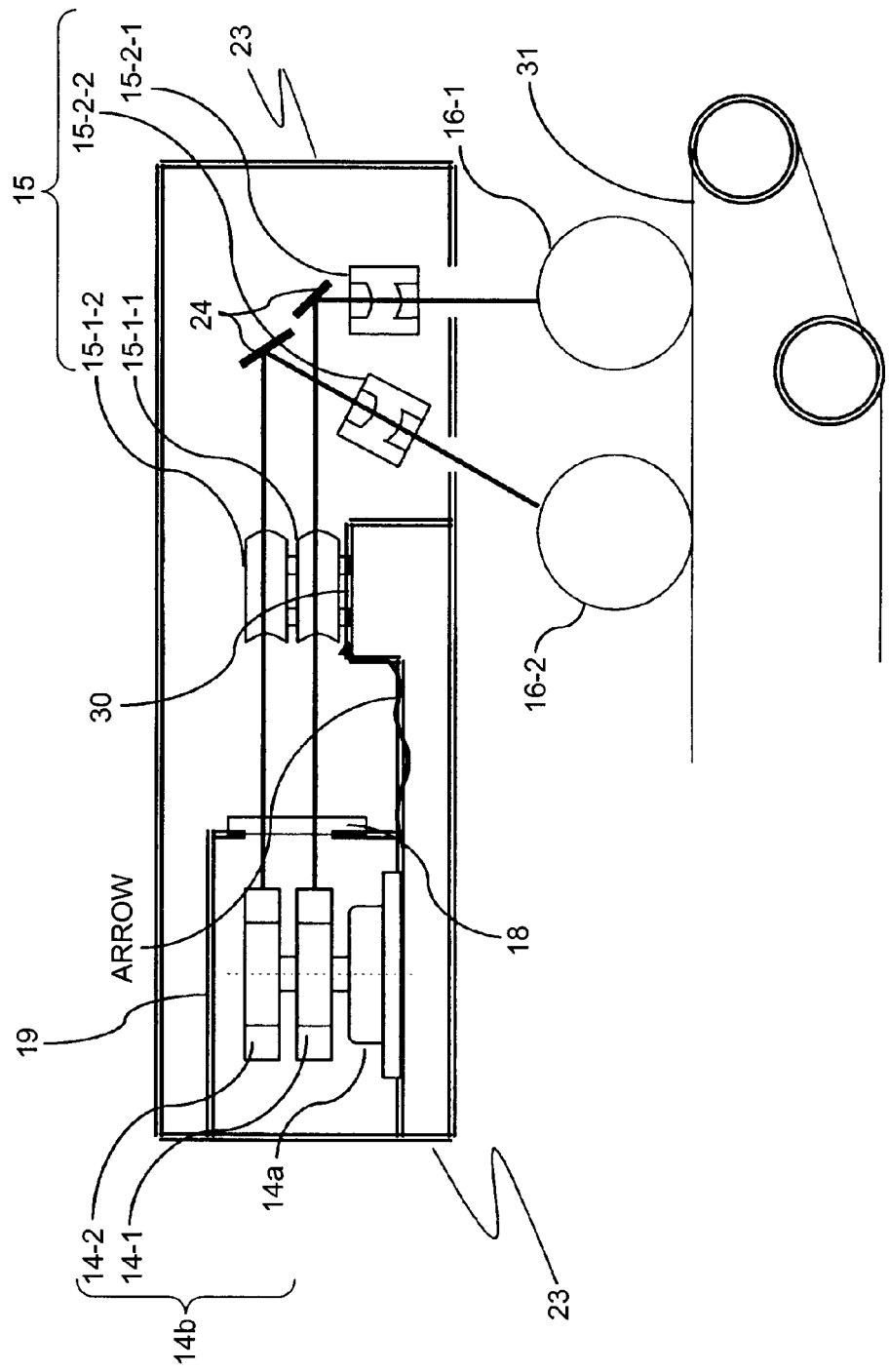

X: OPTICAL-AXIS DIRECTION
Y: MAIN SCANNING DIRECTION
Z: SUB-SCANNING DIRECTION

X: OPTICAL-AXIS DIRECTION
Y: MAIN SCANNING DIRECTION
Z: SUB-SCANNING DIRECTION

X: OPTICAL-AXIS DIRECTION
Y: MAIN SCANNING DIRECTION
Z: SUB-SCANNING DIRECTION

OPTICAL SCANNING DEVICE AND IMAGE FORMING APPARATUS

CROSS-REFERENCE TO RELATED APPLICATIONS

The present application claims priority to and incorporates by reference the entire contents of Japanese priority documents, 2006-250858 filed in Japan on Sep. 15, 2006 and 2007-061951 filed in Japan on Mar. 12, 2007.

BACKGROUND OF THE INVENTION

1. Field of the Invention

The present invention relates to an image forming apparatus.

2. Description of the Related Art

Image forming apparatuses such as printers, plotters, and copiers, include an optical scanning device that deflects light beams from an light source by a light deflecting unit such as rotating polygon mirror, focuses the deflected light beams on a target surface through a scanning and focusing optical system such as fθ lens to form a light spot on the surface, and scans the surface with this light spot.

In the process of forming an image, an image is written by optical scanning. Quality of the image formed by the process is influenced by quality of the optical scanning. The quality of optical scanning depends on scanning characteristics in the main scanning direction and in the sub-scanning direction in the optical scanning device.

As one scanning characteristic in the scanning direction may be cited velocity uniformity of optical scanning. For example, when a rotating polygon mirror is used as a light deflecting unit, since deflection of light flux is conducted at uniform velocity, a scanning and focusing optical system having fθ characteristic is used for realizing uniform velocity of optical scanning. However, it is not easy to realize complete fθ characteristic because of relations with other characteristics required for the scanning and focusing optical system. Therefore, in practice, optical scanning is not conducted at perfectly uniform velocity, and velocity uniformity as a scanning characteristic is accompanied with deviation from ideal scanning at uniform velocity.

Examples of scanning characteristics in the sub-scanning direction include curve and inclination of scanning line. A scanning line is a locus of movement of light spot on a target surface, and is ideally a straight line, and an optical scanning device is designed so that the scanning line is straight. However, in practice, curve usually occurs in the scanning line due to processing error, assembling error or the like. When a focusing mirror is used as a scanning and focusing optical system and a certain angle is made in the sub-scanning direction of deflected light flux between incident direction and reflection direction to/from an focusing mirror of the deflected light flux, in principle, scanning line curves or inclines. Even when the scanning and focusing optical system is arranged as a lens system, scanning-line curve is inevitable in a multi-beam scanning system which optically scans a target surface with a plurality of light spots separated in the sub-scanning direction.

Scanning-line inclination indicates that the scanning line does not appropriately cross the sub-scanning direction at a right angle, and is one type of scanning-line curve. In the following, the term "scanning-line curve" includes scanning-line inclination unless otherwise specified.

Imperfect velocity uniformity of optical scanning causes distortion in the main scanning direction in the formed image, and scanning-line curve causes distortion in the sub-scanning direction in the resultant image. At this time, when an image is written and formed by a monochromatic, single optical scanning device, distortion "that is recognizable at one view" does not occur in the formed image so far as scanning-line curve and imperfectness of velocity uniformity (deviation from ideal uniform velocity scanning) are suppressed to some extent. However, it is still desired to control such image distortion as small as possible.

In color copiers and the like, images of three color components: magenta, cyan, and yellow, or four color components: magenta, cyan, yellow, and black, are superimposed one upon another to form a color image.

A tandem image forming system is used for forming color images, in which an image of each color component is formed on a photoconductor using an optical scanning device provided for each color component. In such an image forming system, when degrees of scanning line curve or inclination mutually differ between different optical scanning devices, color misregistration or color shift occurs in the color image even if scanning-line curve is corrected at least for each optical scanning device, and impairs image quality of the color image. For example, color shade may not be desired one in a color image due to color misregistration.

To prevent such color misregistration, for example, Japanese Patent Application Laid-Open No. 2002-131674 (Claim 1 and FIG. 3) has proposed a structure that corrects scanning-line curve by implementing a supporting part on either side which sandwiches an optical axis of long lens in the sub-scanning direction by an adjusting part using an adjusting screw capable of moving in the optical-axis direction of the long lens, and rotating and adjusting the long lens in the section perpendicular to the deflecting and scanning direction through degree of fastening of the adjusting screw.

Japanese Patent Application Laid-Open No. 2005-241753 (Claim 1 and FIG. 6) has proposed an optical scanning device which effectively suppresses deformation due to temperature change of focusing elements made of resin involved in an scanning and focusing optical system and is capable of accurately correcting any one of scanning-line curve and velocity uniformity or both.

However, the structure disclosed in Japanese Patent Application Laid-Open No. 2002-131674 cannot cope with environmental variation that affects material of the lens used in a focusing optical system.

In brief, with the recent intention to improvement of scanning characteristics, a specific surface represented by aspheric surface is generally employed in a focusing optical system of optical scanning device, and focusing optical systems fabricated from resin materials that are facilitate formation of such specific surface and low in costs are often used. However, optical characteristic of a focusing optical system made of resin is easy to change under influence of change in temperature or humidity, and such change in optical characteristic also changes the degree of scanning-line curve or velocity uniformity. Therefore, when several tens of color images are sequentially formed by the image forming apparatus, the internal temperature increases, which changes optical characteristic of focusing optical system. This also changes degree of scanning-line curve for writing in each optical writing device, and gradually changes velocity uniformity, resulting in that a color image obtained in early stage and a color image obtained in final stage may have completely different color shades due to color misregistration.

A scanning and focusing lens such as fθ lens which is representative of a scanning optical system is generally formed as a strip-shape lens that is long in the main scanning direction by cutting a lens unnecessary part (part where deflected light flux does not enter) in the sub-scanning direction. When the scanning and focusing lens is made up of a plurality of lenses, the farther the disposed position is from the light deflecting unit, the larger the length of the lens in the main scanning direction, and a long lens having length of 10 and several centimeters to 20 centimeters or longer is required. Such a long lens is generally formed by resin molding. However, when temperature distribution in the lens becomes nonuniform due to change in external temperature, warpage occurs and the lens becomes arcuate in the sub-scanning direction. Such warpage of long lens may cause scanning-line curve as described above, and scanning-line curve enormously occurs when the warpage is significant. Such phenomenon occurs even when initial adjustment is conducted using the structure shown in Japanese Patent Application Laid-Open No. 2002-131674. In the structure, no countermeasure against scanning-line inclination which is a cause of defects such as color misregistration as well as scanning-line curve is taken. Further, the structure has such a drawback that positioning accuracy is difficult to be ensured because positioning of lens in the optical-axis direction changes depending on the fastening degree of screw.

On the other hand, in Japanese Patent Application Laid-Open No. 2005-241753, change in shape (warpage, etc.) of focusing element made of resin caused by temperature change is suppressed by surrounding the focusing element made of resin by a member of relatively high rigidity. However, with this structure, the number of parts increases and the size of module increases, so that a problem arises in mechanical layout inside the apparatus.

Also, for example, heat generated by driving of a rotating polygon mirror is transmitted to an optical element group together with the air flow of flight generated by rotation of the polygon mirror that is usually rotated and driven at high speed. As a result, temperature of the optical element group rises, and optical characteristic thereof is changed. Particularly, a problem arises in temperature of scanning lens that is, for example, a fθ lens at closest position of the polygon mirror contained in the optical element group.

That is, when the light deflector containing the polygon mirror and the scanning lens are located in the same space, air flow of high temperature generated by high speed rotation of the polygon mirror directly contacts the scanning lens to raise the temperature of the scanning lens, and at this time, since temperature rises in such a state that the scanning lens has temperature distribution in the main scanning direction and the sub-scanning direction under influence of distance from the light deflector that is source of heat generation and orientation of air flow corresponding to the rotation direction of the polygon mirror rather than uniformly raising the temperature of the scanning lens, shape accuracy and refractive index of the scanning lens change, a spot position of laser beam shifts, and positional deviation arises, and in the image forming apparatus, image quality is deteriorated, for example, due to color misregistration.

This problem is particularly significant for the case of a lens made of resin having large coefficient of thermal expansion and low heat conductivity. This is important issue in the recent circumstances that an optical element having specific surface represented by aspheric surface is generally employed in a focusing optical system of an optical scanning device with the intention to improvement in scanning characteristic, and a focusing optical system using optical elements made of resin as an optical element group is often employed to easily form an optical element having such specific surface with low costs.

In particular, a scanning and focusing lens such as fθ lens that is representative of a scanning lens is generally formed as a strip-shape lens that is long in the main scanning direction by cutting a lens unnecessary part, that is, the part other than the part where deflected light flux enters, in the sub-scanning direction, and has large lens length in the main scanning direction. Therefore, when it is made of resin as described above, warpage arises and the lens assumes a shape which is arcuate in the sub-scanning direction, namely a shape which is arched when the lens is viewed from the optical-axis direction, when the temperature distribution inside the lens is nonuniform, which is very problematic.

As described above, optical characteristic of the scanning lens molded of a resin material is easy to change under influence of temperature, and such change in optical characteristic also changes the degree of scanning-line curve and velocity uniformity. Therefore, in an image forming apparatus, for example, when several tens of color images are formed continuously, internal temperature increases due to the continuous operation, and optical characteristic of focusing optical system changes, and degree of scanning-line curve for writing in each optical writing device (optical scanning device) and velocity uniformity gradually change, resulting in that a color image obtained in early stage and a color image obtained in final stage may have completely different color shades due to color misregistration. This color misregistration is peculiar and significant in an image forming apparatus.

If distance between the outer circumference of motor housing of light deflector and scanning lens differs in the main scanning direction, difference arises by radiation and conduction of heat, so that temperature distribution in the main scanning direction is likely to occur in the scanning lens. Further, in the case of an optical scanning device in which scanning lenses are disposed symmetrically with respect to the light deflector, temperature distribution of each scanning lens is opposite to each other in the main scanning direction, so that difference in changes of shape accuracy and refractive index of scanning lenses symmetrically disposed tends to increase, leading further increase in color misregistration as described above.

On the other hand, temperature rise due to heat generation of light deflector induces slight movement of polygon mirror and other flange to which rotor magnet is secured, rotating parts such as shaft, and high-load polygon mirror having especially large mass proportion, and changes the balance of rotation of polygon mirror and the like, thereby causing vibration. In other words, when coefficient of thermal expansion differs between rotating parts such as polygon mirror, or when strict management and inspection of tolerance of parts or securing method are failed although coefficient of thermal expansion matches between such parts, slight movement occurs due to change in balance of such rotating members during high temperature and high speed rotation, which may eventually increase vibration.

The problems of such positional difference, color misregistration and vibration clearly arise in the present circumstance in which it is requested to rotate a light deflector at high speed of not less than 25,000 rpm with high accuracy in a tandem image forming apparatus having for example, four photosensitive drums or photoconductors arranged in a convey direction of recording paper, for obtaining a color image by making latent images through simultaneous exposure by a plurality of scanning optical systems corresponding to the respective photosensitive drums, visualizing these latent images at developers using different colors of developing agents such as yellow, magenta, cyan and black, and sequentially superimposing these visualized images on the same recording paper, followed by transferring, for realizing high speed printing and high quality in an image forming apparatus.

For responding to recent demand for decrease in diameter of laser beam emitted to a surface of an image carrier, and increase in image quality, it is necessary to increase diameter of laser beam that enters the polygon mirror, so that diameter of inscribed circle of polygon mirror, and surface width in the main scanning direction and the sub-scanning direction tend to be relatively large and the load tends to be higher. However, increase of load results in increase in amount of heat generation due to increase in consumed power, and make the problem of positional deviation, color misregistration and vibration significant.

In an image forming apparatus having, as writing units of different colors: yellow, magenta, cyan, and black, optical scanning devices corresponding to the respective colors as with a tandem image forming apparatus, there is a problem that shape and refractive index of each scanning lens change, optical characteristic changes, deviation of spot position of laser beam on the surface of an image carrier, and scanning-line curve occur, relative positions of scanning lines of respective colors differ from each other, color misregistration significantly occurs, and quality of color image is significantly deteriorated, particularly caused by temperature change due to influence of heat generation at the light deflector in each optical scanning device.

Japanese Patent Application Laid-Open No. 2001-4948 discloses a multi-beam light source scanning apparatus that includes a plurality of light sources, a polygon mirror, and an optical system made up of a plurality of optical members for converging each laser beam reflected by the polygon mirror into a respective one of a plurality of objects to be irradiated. At least one optical member of the optical members is adapted to allow passage of all of the laser beams, and the optical member through which all of the laser beams pass is realized by a single member made of a single material.

In such an apparatus, even when an optical characteristic of the optical member through which all of the laser beams corresponding to the respective colors pass is changed due to temperature change or the like, all the laser beams are equally influenced by the change of the optical characteristic of the optical member, so that it is possible to prevent positional deviation in the scanning direction of laser beam from occurring between laser beams, for example. Therefore, when this multi-beam light source apparatus is applied to a color printer or color copier, positional deviation in the main scanning direction does not occur between laser beams that scan on the respective photosensitive drums provided in correspondence with each colors, and color misregistration in an image printed onto recording paper by the photosensitive drums can be prevented. Further, since the optical member through which all of the laser beams pass is realized by a single member made of a single material, an effect that the structure is simplified can be obtained.

However, when the light deflector and the optical member, particularly the scanning lens located closest to the light deflector is provided in the same space of the optical housing, high temperature air from the light deflector directly contacts the scanning lens, so that heat generation at the light deflector easily transmits to the optical member together with air flow accompanying high speed rotation, and temperature of the optical member rises. Further, since heat transmits also from the contact face of the optical housing, temperature distribution is not actually uniform both in the horizontal and sub-scanning directions in the scanning lens and some distribution exist. Therefore, the color misregistration occurs.

Japanese patent No. 3686644 discloses a technology for suppressing positional deviation of light spot in the main scanning direction on photoconductor. Even when temperature distribution in the main scanning direction arises inside the scanning lens L1, and optical characteristic changes, the influence exerts equally to all light beams because the light beams traveling toward different photoconductors commonly pass through the scanning lens L1, by using an apparatus employing such a structure that the scanning lens L1 that is located closer to the deflector of two scanning lenses is shared by light beams traveling toward different photoconductors.

However, even when such a structure is employed, temperature distribution actually arises in the sub-scanning direction of the scanning lens L1, so that it is often the case that influence of change in optical characteristic of the scanning lens L1 generally differs between optical beams which pass different positions in the sub-scanning direction. Therefore, color misregistration as described above sometimes arises.

Japanese Patent Application Laid-Open No. 2001-228416 discloses a technology in which a driving part other than an optical scanning device disposed either side generates heat by startup of an image forming apparatus; even when an optical housing of the optical scanning device expands in the sub-scanning direction due to the heat generation, the opposite side of the driving part equally expands in the sub-scanning direction due to heat generation of driver of a polygon scanner control circuit. Thus, color misregistration of image can be prevented by reducing difference between extension in the sub-scanning direction of one side of the main scanning direction, and extension of the other side to allow uniform expansion in the sub-scanning direction, and by keeping the scanning lines on the respective photoconductors parallel with each other.

However, in such a structure, since heat generation of controlling unit is used, temperature rise of the entire system is large in a polygon scanner rotating at a speed of 25,000 rpm that realizes high speed image formation, and in the case of scanning lens made of plastic or the like, change in refractive index is large, and positional deviation of zoom spot occurs. Therefore, color misregistration as described above may occur.

Japanese Patent Application Laid-Open No. 2005-234506 proposes an optical scanning device mounted in an image forming apparatus such as copier, facsimile machine and printer that reduces temperature rise of optical element and temperature deviation, vibration of deflecting member, and positional deviation of beam with high accuracy, as well as an image forming apparatus having the optical scanning device. However, this conventional technology does not take account of difference in "visual sensitivity" of toner color, and therefore, is incapable of reducing color misregistration (inevitably occurring with temperature change) exerted on "visual impression" to color image quality.

As described above, according to the conventional technologies, although any one of temperature change and temperature distribution or both of an optical scanning device, or an optical housing or optical elements housed therein can be reduced, but cannot be totally eliminated. Therefore, when scanning-line curve caused by temperature change or temperature distribution occurs, color misregistration is perceptible when visual sensitivity of color component corresponding thereto is high, and deterioration of color image is sensually and greatly recognized.

SUMMARY OF THE INVENTION

It is an object of the present invention to at least partially solve the problems in the conventional technology.

According to an aspect of the present invention, an image forming apparatus includes a plurality of photoconductors, an exposing unit that exposes the photoconductors to light beams to form an electrostatic latent image on each of the photoconductors, a developing unit that visualizes the electrostatic latent image with at least two colors of toner, a transfer unit that transfers visualized image onto a recording medium, and a fixing unit that fixes the visualized image on the recording medium. The exposing unit includes a plurality of light sources that emits light beams; a deflector that deflects the light beams from the light sources; a scanning optical system that includes a plurality of focusing elements, and scans the photoconductors with the light beams from the deflector; and a housing that houses therein the light sources, the deflector, and the scanning optical system. The focusing elements includes a first focusing-element group of resin focusing elements aligned in a sub-scanning direction such that at least one focusing element of the first focusing-element group corresponds to one of the light beams. A light beam corresponding to a toner color of low visual sensitivity passes through one focusing element of the first focusing-element group with which a scanning-line shape on the photoconductors changes largely due to temperature change in the housing.

According to another aspect of the present invention, an image forming apparatus includes a plurality of photoconductors, an exposing unit that exposes the photoconductors to light beams to form an electrostatic latent image on each of the photoconductors, a developing unit that visualizes the electrostatic latent image with at least two colors of toner, a transfer unit that transfers visualized image onto a recording medium, and a fixing unit that fixes the visualized image on the recording medium. The exposing unit includes a plurality of light sources that emits light beams; a deflector that deflects the light beams from the light sources; a scanning optical system that includes a plurality of focusing elements, and scans the photoconductors with the light beams from the deflector; and a housing that houses therein the light sources, the deflector, and the scanning optical system. The focusing elements includes a first focusing element made of resin through which the light beams are scanned on the different photoconductors. A light beam corresponding to a toner color of low visual sensitivity passes through an area of the first focusing element with which a scanning-line shape on the photoconductors changes largely due to temperature change in the housing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table of relation between appearance (direction) of scanning-line curve and deviation (color misregistration) in stations M and Y caused by temperature change;

FIG. 14 is a schematic diagram of an image forming apparatus according to an embodiment of the present invention;

DETAILED DESCRIPTION OF THE PREFERRED EMBODIMENTS

Exemplary embodiments of the present invention are explained in detail below referring to the accompanying drawings.

In the following, while a scanning lens is explained as a focusing element constituting a scanning optical system, a scanning mirror can also be used as a focusing element. An optical path of a laser beam from an light source to a photosensitive drum (photoconductor) having a surface to be scanned (target surface) via a coupling lens, a cylindrical lens, a deflector (polygon mirror), a scanning lens, a folding mirror and the like, as well as mechanical structures for supporting them is hereinafter collectively referred to as "station". The following description pertains mainly to an optical scanning device of single beam scanning system in which a single laser beam is scanned on a photoconductor corresponding to each of a plurality of stations. However, the same can be applied to a multi-beam scanning system in which a plurality of laser beams is scanned simultaneously on a single photoconductor.

Figure 1:
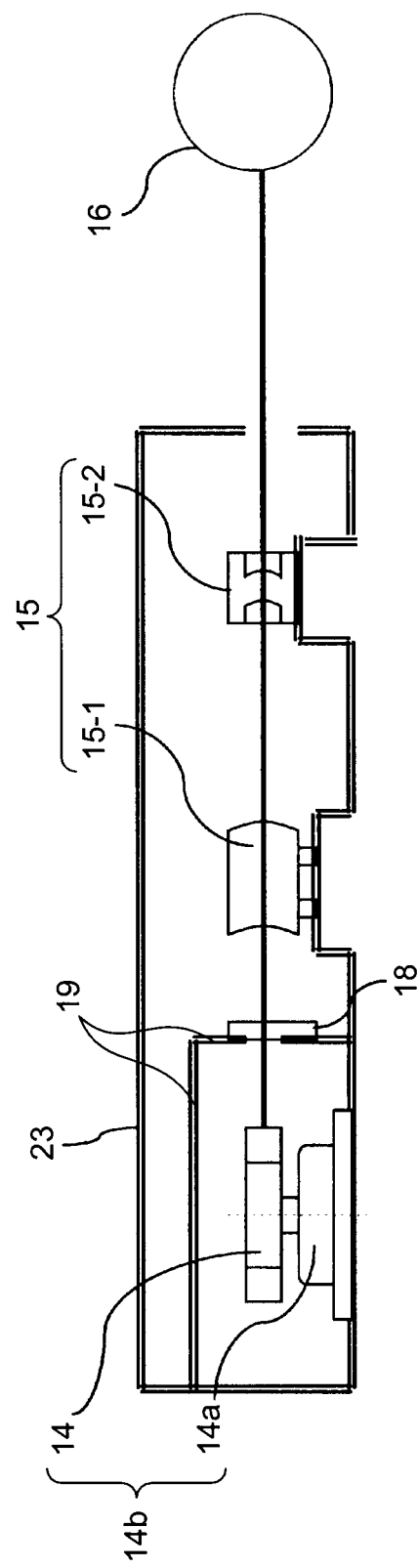
FIG. 1 is a schematic diagram of an optical scanning device according to an embodiment of the present invention.

FIG. 1 is a schematic diagram of an optical scanning device according to an embodiment of the present invention. A laser beam emitted from an light source such as semiconductor laser (not shown) is converted into a generally parallel light flux by action of a coupling lens (not shown), and then focused as a linear image which is longer in the main scanning direction on a deflecting and reflecting surface of a polygon mirror (deflector) 14 by action of a cylindrical lens (not shown). The polygon mirror 14 is mounted on a so-called polygon motor 14a to configure a polygon scanner, and rotates at high speed (several tens thousand rpm), so that it may cause noise or generate heat due to windage loss in an edge part of the polygon mirror 14. Further in the polygon motor 14a, heat generation may be caused by a bearing or a driving circuit substrate. Therefore, for the purpose of preventing noise and diffusion of heat by air flow, the polygon scanner 14b is often surrounded by a wall 19. In such a case, a transparent substrate (soundproof glass) 18 is disposed for allowing passage of beams.

A laser beam deflected and reflected by the polygon mirror 14 scans on a surface of a photosensitive drum (target surface) 16 as light spots via a scanning optical system 15. The scanning optical system 15 includes a first scanning lens 15-1 and a second scanning lens 15-2.

The above described cylindrical lens, polygon scanner 14b, scanning optical system 15 and the like are housed in an optical housing 23. The optical housing 23 is fabricated by aluminum dye casting, resin molding or the like. The one made of resin is often employed in a low-end machine because it can be fabricated with low cost. However, such housing often leads the problems of low heat conductivity, low rigidity and the like. For this reason, in a high-end machine, the one made of aluminum is often employed because it has good heat conductivity and it can realize high rigidity.

Generally, since a high-end machine often outputs a large number of prints (for example, several tens prints to one hundred and several tens of prints per a minute), rotation speed of the polygon scanner 14b is as high as several tens of thousands of rpm or more, and accordingly the amount of heat generation is tremendous. For this reason, it is necessary to surround the polygon scanner 14b with the wall 19 (and soundproof glass 18) as described above.

Although diffusion of heat by air flow can be suppressed by surrounding the polygon scanner 14b with the wall 19, it is impossible to prevent heat from diffusing in the member of optical housing 23 through heat conductivity. This is significant in the case of an aluminum optical housing. Further, when the optical scanning device is used as an exposing device of an image output apparatus using electrophotography, it may possibly be influenced by heat generated at a fixing device or the like that transfers a developed toner image onto a recording medium.

In this way, there is a possibility that heat transmits through the member of the optical housing 23 to reach the first scanning lens 15-1 and the second scanning lens 15-2. When the first/second scanning lens 15-1, 15-2 is made of resin, in particular, temperature distribution (deviation) may arise due to difference in heat conductivity with respect to the optical housing 23. This temperature distribution causes changes in physical property values such as refractive index or shape of the optical surface (or straightness of the entire lens) of the first/second scanning lens 15-1, 15-2, so that change (deterioration) in optical performances such as beam spot diameter or scanning-line shape on the target surface 16 occurs. Change in scanning-line shape causes deviation in superimposing toner images resulting in color misregistration, i.e., in the sub-scanning direction between each stations in a tandem image forming apparatus, and the deterioration appears more significantly in a half-tone image, in particular.

Figure 2:
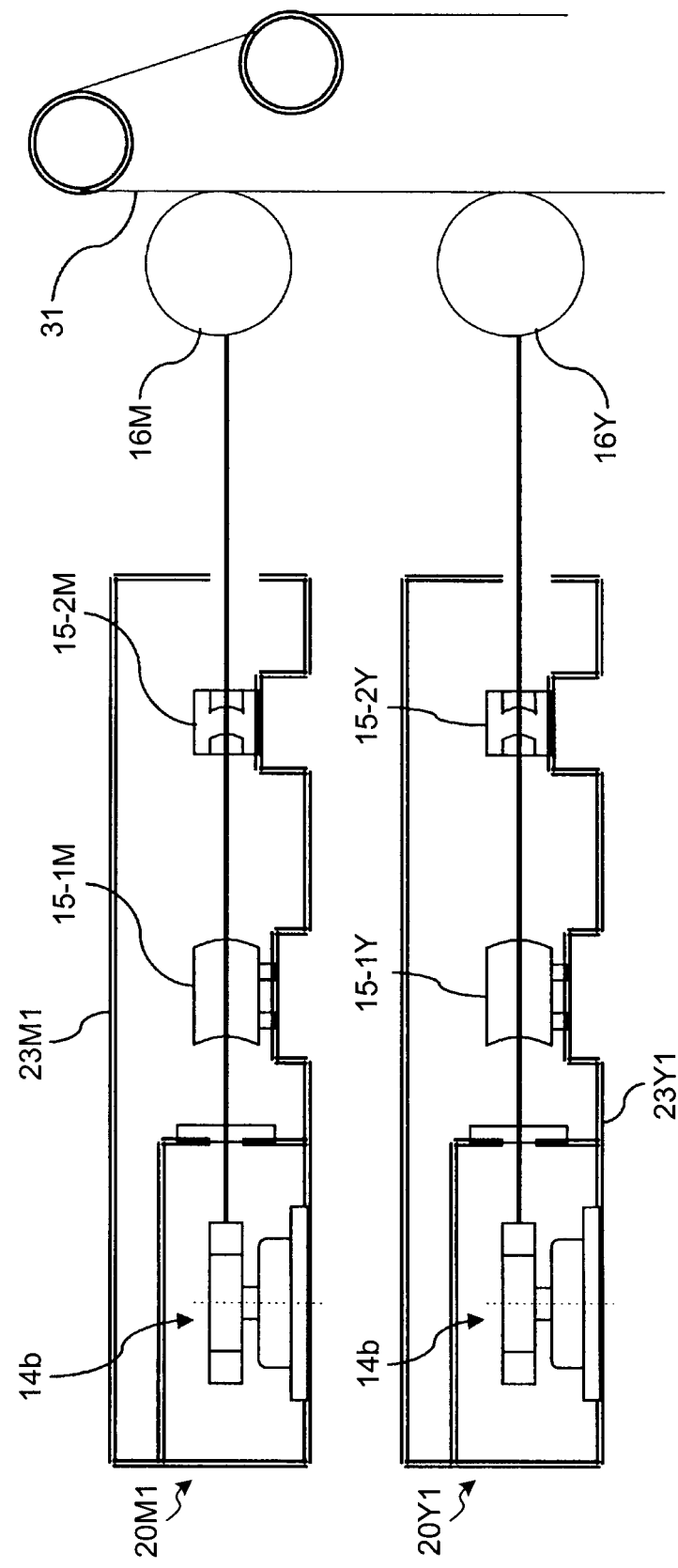
FIG. 2 is a schematic diagram of a first example of the optical scanning device.

First, the structure in which curving direction of scanning lines due to temperature change are matched between each stations is explained. FIG. 2 is a schematic diagram of a color image (two-color image) forming apparatus with two optical scanning devices as shown in FIG. 1. A developing device, a transferring device, a fixing device and the like that do not enter into the present invention are not shown. A double-station type optical scanning device (two-image forming apparatus) is explained below. However, it may be applied to any double-stations in an optical scanning device (multicolor image forming apparatus) having more stations. As described above, the term "station" refers to an optical path and an optical element located between a light source in an optical scanning device and a target surface (photoconductor), as well as mechanical structures for supporting them. The light source can be a multi-beam light source, and a multi-beam scanning system that simultaneously scan one target surface with a plurality of laser beams can be employed.

Optical scanning devices 20M1 and 20Y1 each forms an independent station, and a laser beam that is modulated according to image data draws a scanning line on the photosensitive drums 16M and 16Y. After a toner image is formed by electrophotography in correspondence with the shape of the scanning line, the toner image is transferred onto an intermediate transfer belt 31. If the shape of the scanning line differs between the optical scanning devices 20M1 and 20Y1, toner images to be superimposed onto the intermediate transfer belt 31 are misregistered.

As is described previously, in an optical scanning device, the heat generated at the polygon scanner rotating at high speed reaches the first scanning lens 15-1 and the second scanning lens 15-2 via the optical housing 23 to change the refractive index and shape of optical surface (straightness of the entire lens). As a result, the scanning-line shape changes as shown in FIG. 3, in the image forming apparatus in FIG. 2.

FIG. 3 is a table of relation between the appearance (direction) of scanning-line curve due to temperature change and its deviation (color misregistration on recording medium) between stations M and Y. Note that, in FIG. 3, the horizontal direction represents the main scanning direction, while the vertical direction represents the sub-scanning direction. The amount of color misregistration (iv)=curve component of the station M (i)-curve component of the station Y (ii). For example, when toner images are superimposed together while curving direction of scanning lines of both the stations are matched, color misregistration is the most severe at the center image height in the cases of (c) and (d) of FIG. 3. In FIG. 3, (a) to (d) depict shapes of scanning lines on the photosensitive drums 16M and 16Y before rotation of the polygon scanner 14b ((a) in FIG. 3) and after rotation of polygon scanner ((b) to (d) in FIG. 3). The shape of the scanning line may be represented by a sum of component of the first scanning lens 15-1 and component of the second scanning lens 15-2.

In the case of (a) in FIG. 3, the scanning-line shape is straight, and therefore, color misregistration does not occur. As shown in FIG. 2, by making the secured face side of the first/second scanning lens 15-1M and 15-2M (contact face with optical housing 23M1), and the secured face side of the first/second scanning lens 15-1Y and 15-2Y (contact face with optical housing 23Y1) coincidence with each other in the optical scanning devices 20M1 and 20Y1, the scanning-line shape on the photoconductor changes into a similar shape as shown in (b) in FIG. 3, so that color misregistration can be minimized. That is, in the case of (b) in FIG. 3, the scanning line is in a shape of upward convex in both the stations M and Y, and there is substantially no deviation between them. Consequently, color misregistration does not occur.

Figure 4:
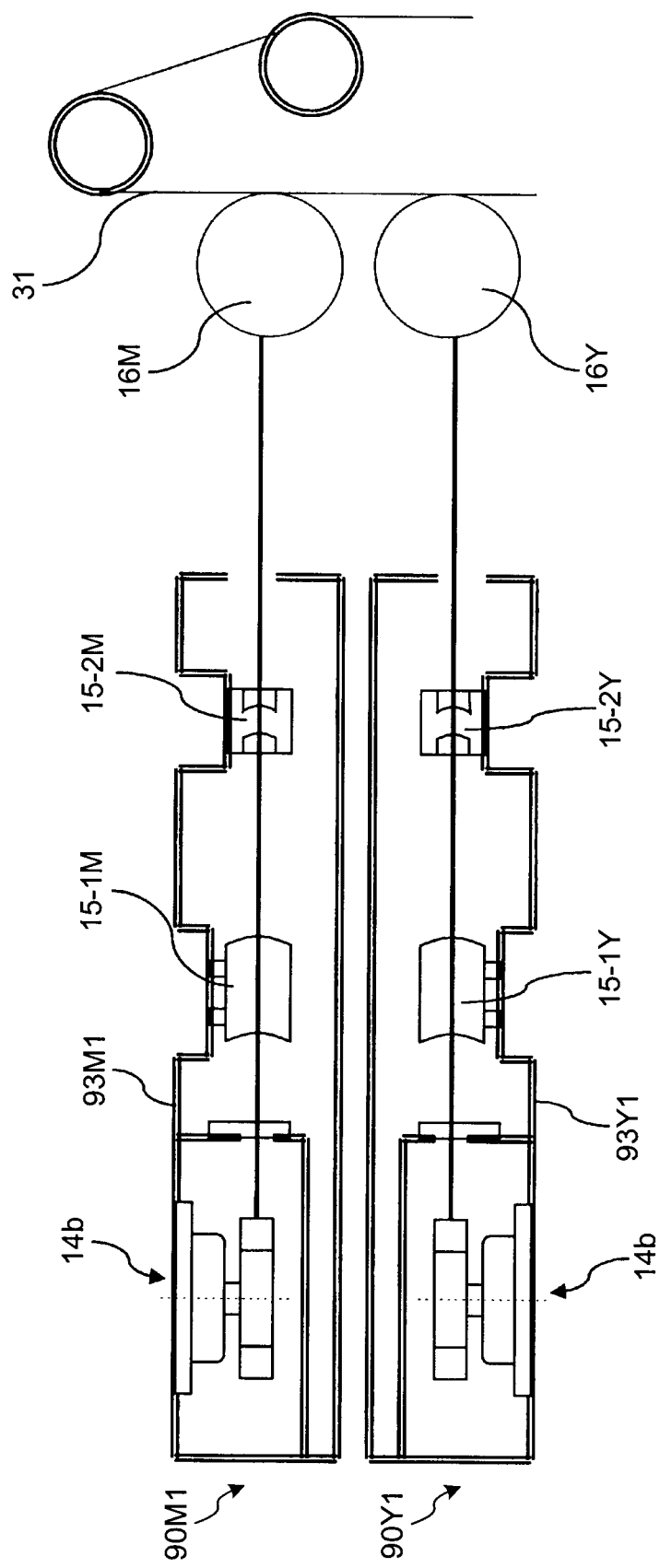
FIGS. 4 and 5 are comparative examples of the optical scanning device shown in FIG. 2.

On the other hand, FIG. 4 is a comparative example of the first example, in which the secured face side of the first/second scanning lens 15-1M and 15-2M (contact face with optical housing 23M1), and the secured face side of the first/second scanning lens 15-1Y and 15-2Y (contact face with optical housing 23Y1) are inverted between both optical scanning devices 90M1 and 90Y1. Therefore, color misregistration occurs as shown in (c) in FIG. 3. That is, in the case of (c) in FIG. 3, curving direction of the scanning-line curves are opposite (upward convex and downward convex) between both the stations M and Y. Therefore, when scanning lines of both the stations M and Y are matched, there is no color misregistration at the outermost image height, while color misregistration is severe at the center image height.

Figure 5:
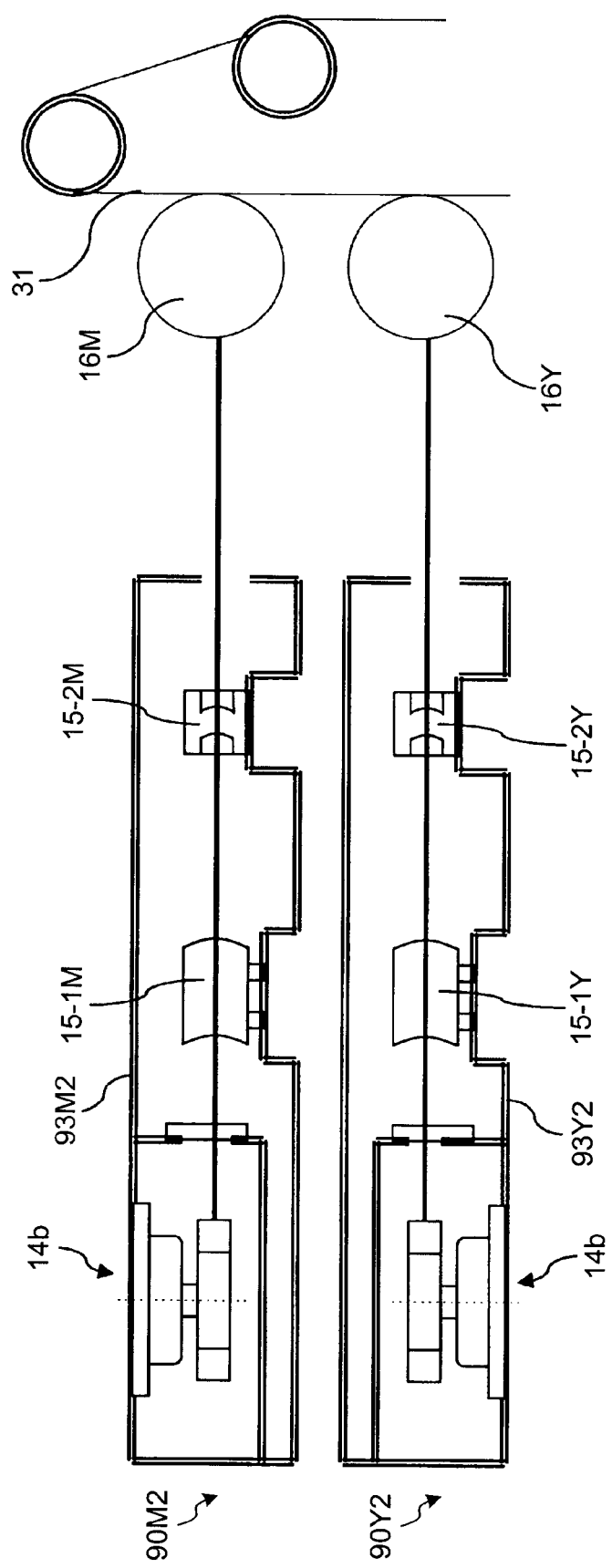

FIG. 5 is another comparative example of the first example, in which, since distance along the optical housing 93M2 (distance in which heat transmits) from the polygon scanner 14b to the first/second scanning lens 15-1M and 15-2M is long on the side of station M (optical scanning device 90M2), change in scanning-line shape is relatively small. Therefore, color misregistration occurs as shown in (d) in FIG. 3. That is, in the case of (d) in FIG. 3, although the scanning lines of both the stations M and Y curve in the same direction, they are different in curving angle. Thus, color misregistration occurs.

A bonding technique to secure scanning lenses is explained below. In securing the first scanning lens 15-1 and the second scanning lens 15-2 to the optical housing 23, it is preferred to employ a bonding technique for achieving low costs. When length of scanning lens in the main scanning direction is denoted by L, it is preferred that the region where top face or bottom face of the scanning optical element contacts the housing member is provided in the area within ±L/4 from the center part of the scanning optical element.

As described above, by securing the scanning lens to the optical housing so that curving direction of scanning lines due to temperature change match between target surfaces, it is possible to reduce color misregistration even if characteristics (refractive index, surface shape, etc.) of the scanning lens change. It is, however, more desired that the change in characteristics of scanning lens is small.

When a scanning lens made of resin is secured on an optical housing made of aluminum by bonding, the scanning lens made of resin deforms due to difference in amount of thermal expansion between, as temperature rises due to rotation of polygon scanner, for example, which may lead occurrence of scanning-line curve. By providing the bonding part in a region within ±L/4 from the center part of the scanning lens, it is possible to reduce deformation of the scanning lens and to suppress change in scanning-line shape.

Next, pressure securing using a spring is explained as another technique for securing the scanning lens. In order to prevent deformation of the scanning lens due to difference in amount of heat expansion, the scanning lens can be secured under pressure to the optical housing by a spring so that it can substantially freely expand (scaling up/scaling down). In the condition that temperature distribution occurs inside the member after temperature change, distribution of refractive index of the scanning lens and shape of the scanning lens also change, which may cause the scanning line-curve. However, when the temperature distribution stabilizes to certain distribution over the time, the distribution of refractive index and change in shape are recovered to the original condition, so that it is possible to reduce the change in scanning-line shape.

In the first example, two independent optical scanning devices form the respective stations is described. This structure can reduce occurrence of deviation in optical property (scanning-line shape, in particular) between each stations (optical scanning devices) as a design value, so that assembling/adjustment of the optical scanning devices can be facilitated. Further, since the optical scanning devices are independent from each other, it is possible to facilitate the replacing operation when a part such as polygon scanner fails to operate properly. For example, when repair is conducted at the site of the user, the optical scanning device itself may be replaced by new one rather than replacing the failed part at the site, and the failed optical scanning device may be separately repaired in a repair plant or the like.

Figure 6:
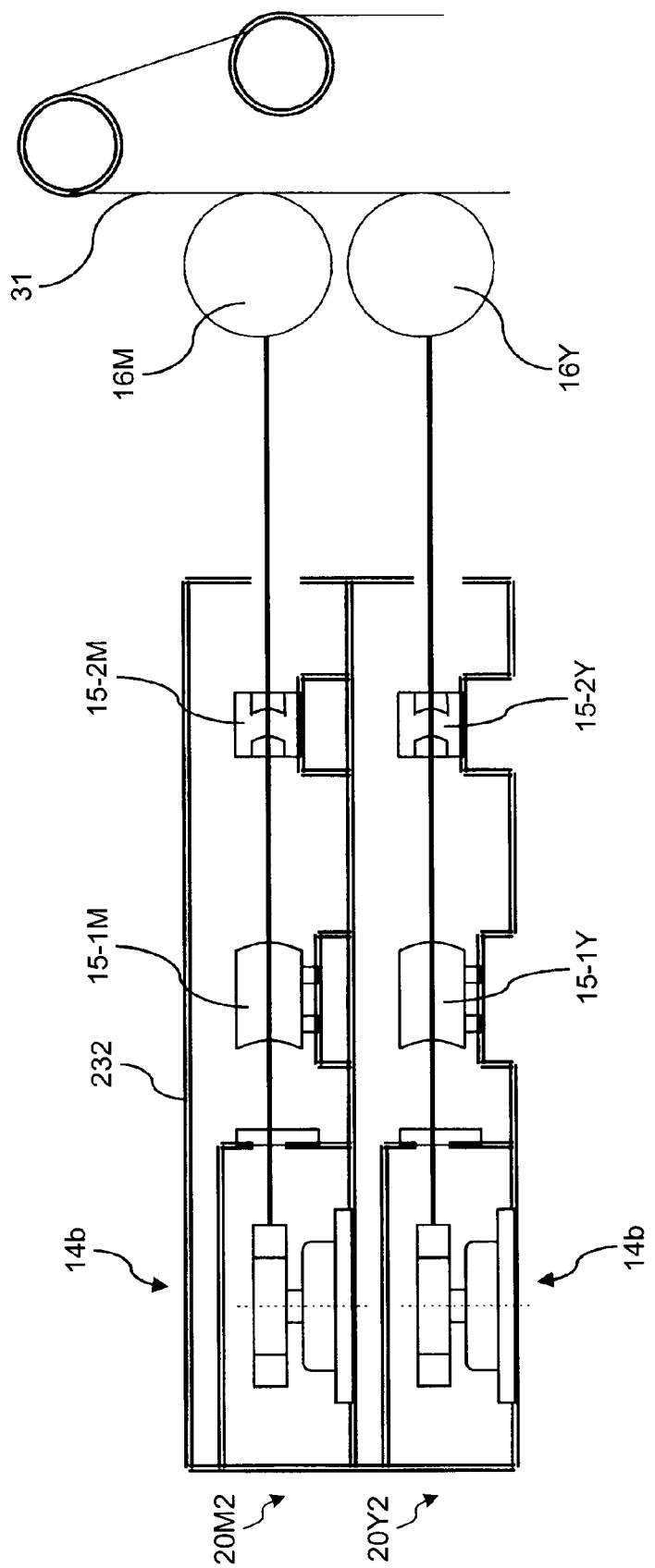
FIG. 6 is a schematic diagram of a second example of an optical scanning device.

In contrast to this, two stations may be housed in an optical housing 23. By housing them in one optical housing, it is possible to reduce the number of assembling steps if assembling and adjustment are required for the optical scanning device (optical housing) in assembling the image forming apparatus in an assembling plant. In such a case, to reduce color misregistration, it is desired to mount the polygon scanner and the scanning lens as shown in FIG. 6. That is, on the optical housing 232, the secured face side of the first/second scanning lens 15-1M and 15-2M (contact face with optical housing 232) and the secured face side of the first/second scanning lens 15-1Y and 15-2Y (contact face with optical housing 232) are made into coincidence with each other in the optical scanning devices 20M2 and 20Y2 so that the relationship of (b) in FIG. 3 is satisfied.

Figure 7:
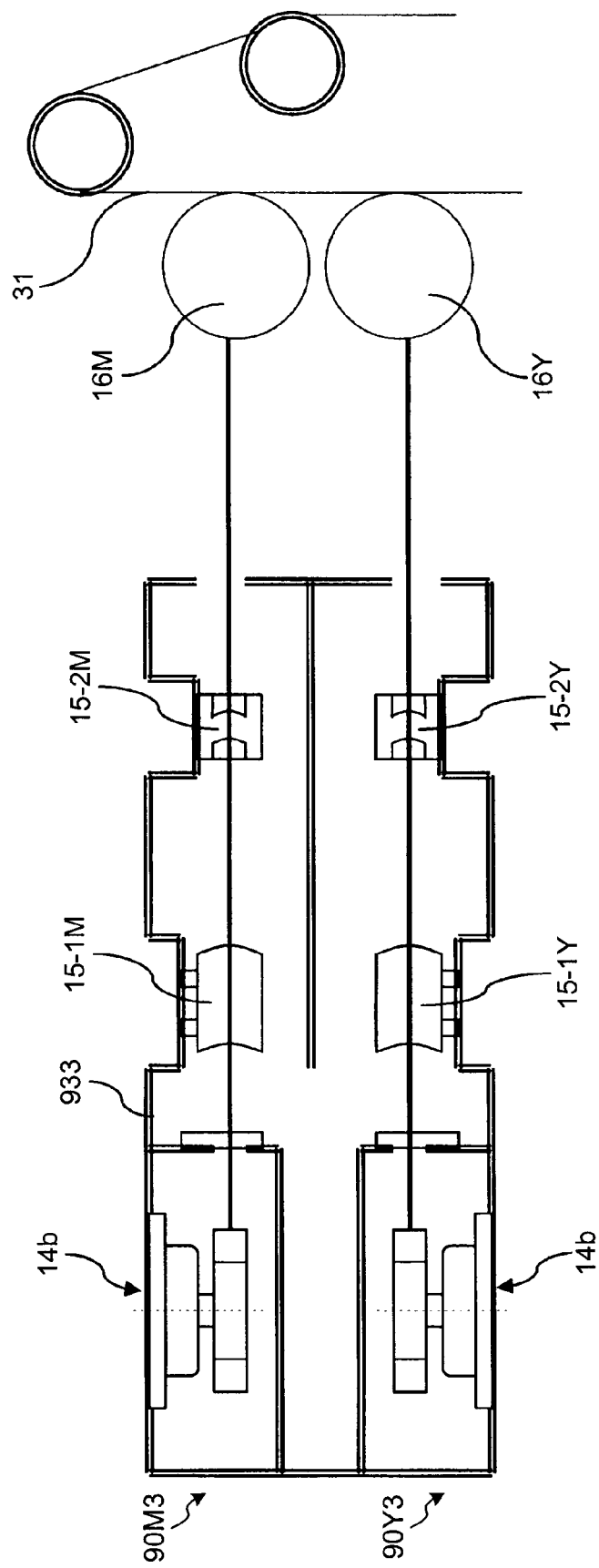
FIGS. 7 and 8 are schematic diagrams of comparative examples of the optical scanning device.
Figure 8:
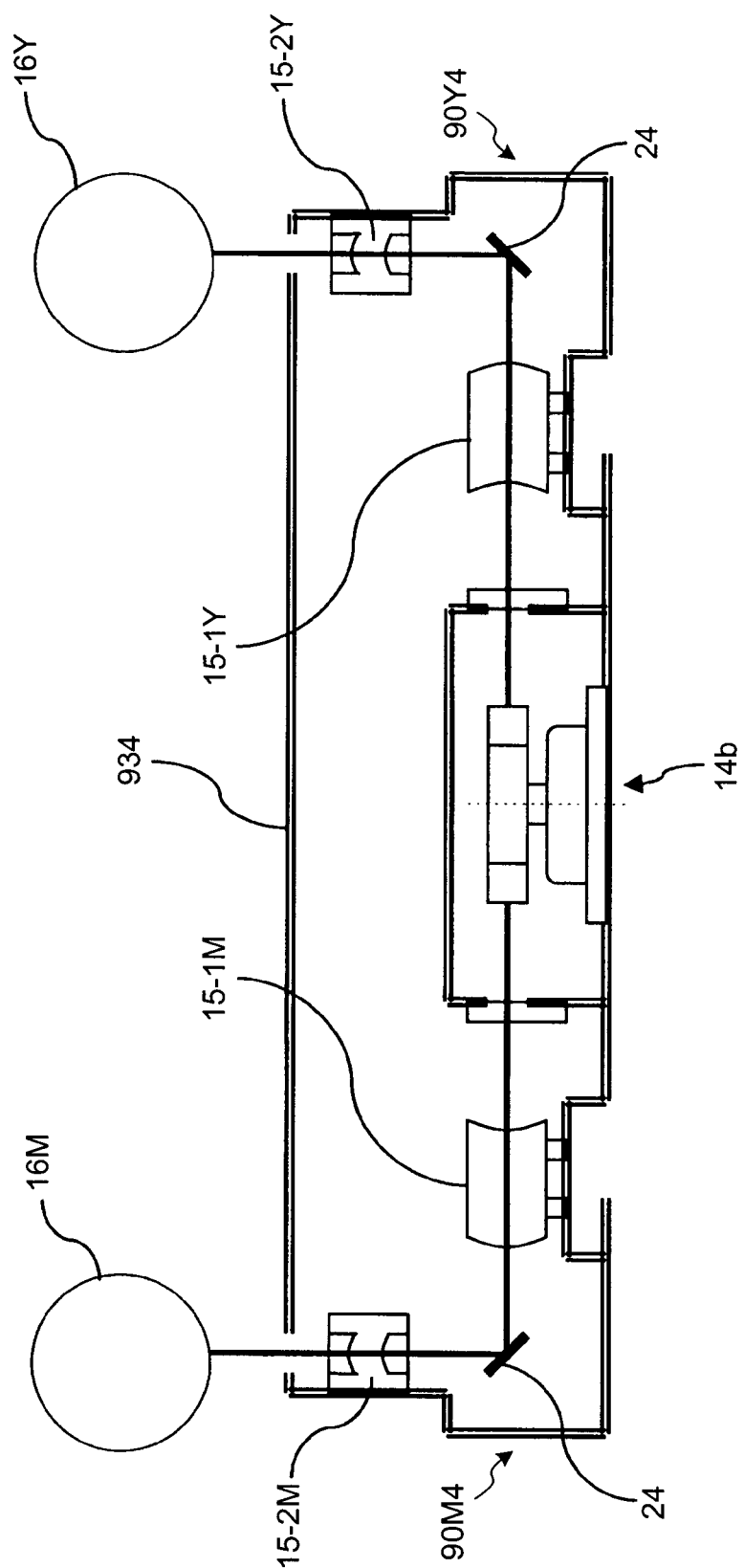
Figure 9:
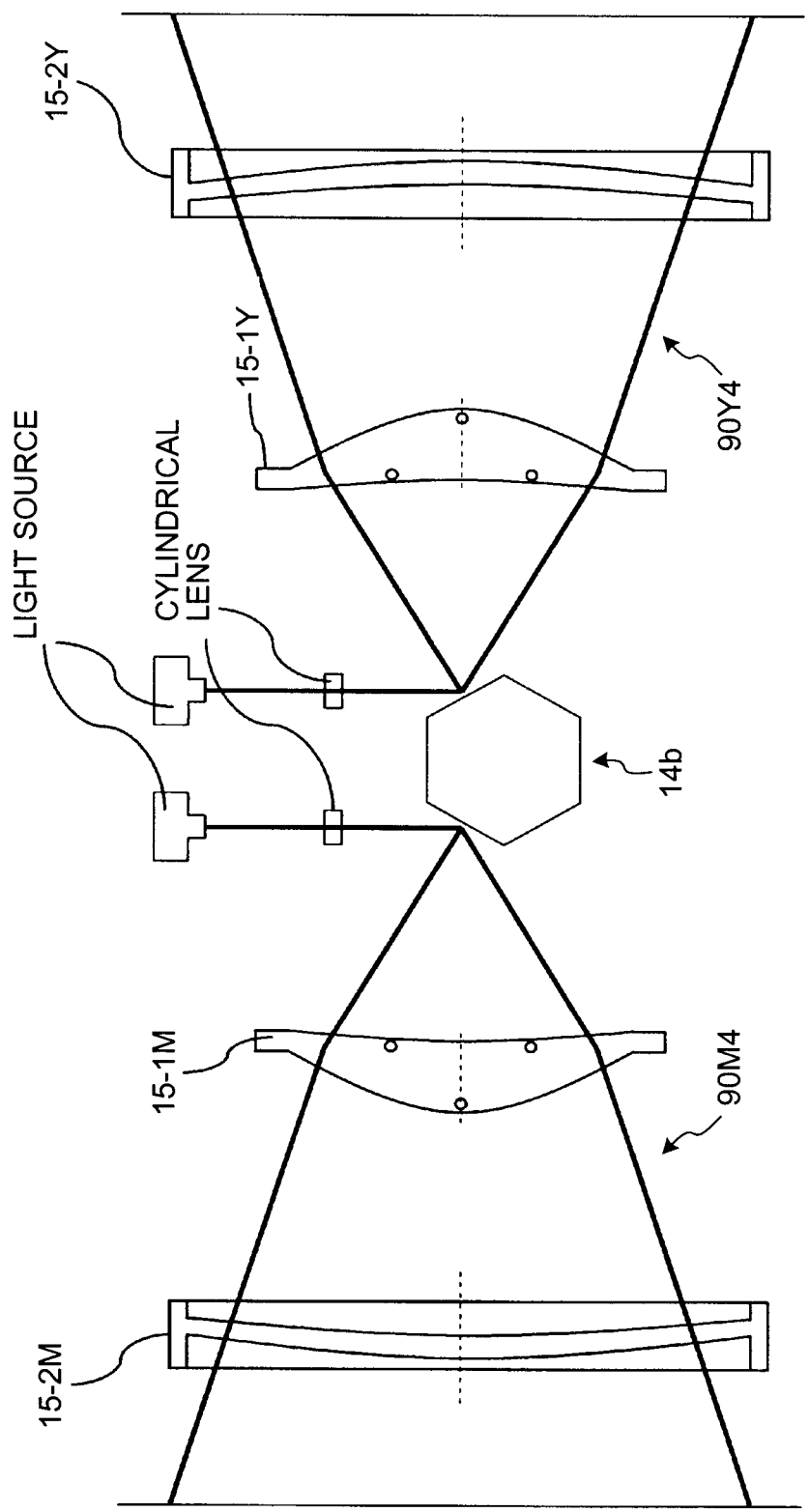
FIG. 9 is a top view of the optical scanning device shown in FIG. 8.

As comparative examples, FIG. 7 depicts optical scanning devices 90M3 and 90Y3 in which two stations M and Y are housed in an optical housing 933. FIGS. 8 and 9 depict optical scanning devices 90M4 and 90Y4 in which two stations M and Y are housed in an optical housing 934. As shown in FIG. 8, for miniaturization of optical scanning device, and limitation of mechanical layout such as photosensitive drum interval in the image forming apparatus, each station is provided with one folding mirror that folds optical path of laser beam. FIG. 9 is an exploded plan view of optical layout without a folding mirror where the stations M and Y are disposed symmetrically on the right and left sides about the polygon mirror 14.

In the structure of FIGS. 8 and 9, first scanning lenses 15-1M and 15-1Y are provided on the side where the polygon scanner 14b is installed in the optical housing 934. Accordingly, heat generation from the polygon scanner 14b transmits to the first scanning lenses 15-1M and 15-1Y which are generally at the same distances, and as a result, the scanning-line shape changes. At this time, difference in the number of folding mirror 24 in the optical path from the first scanning lens 15-1 to the photosensitive drum 16 in both stations is even number (one for each station). Therefore, curving direction of scanning lines are opposite to each other in photosensitive drums 16M and 16Y. That is, color misregistration in toner image on the intermediate transfer belt (not shown)

appears as difference in the amount of scanning-line curve between both stations ((c) in FIG. 3).

Figure 10:
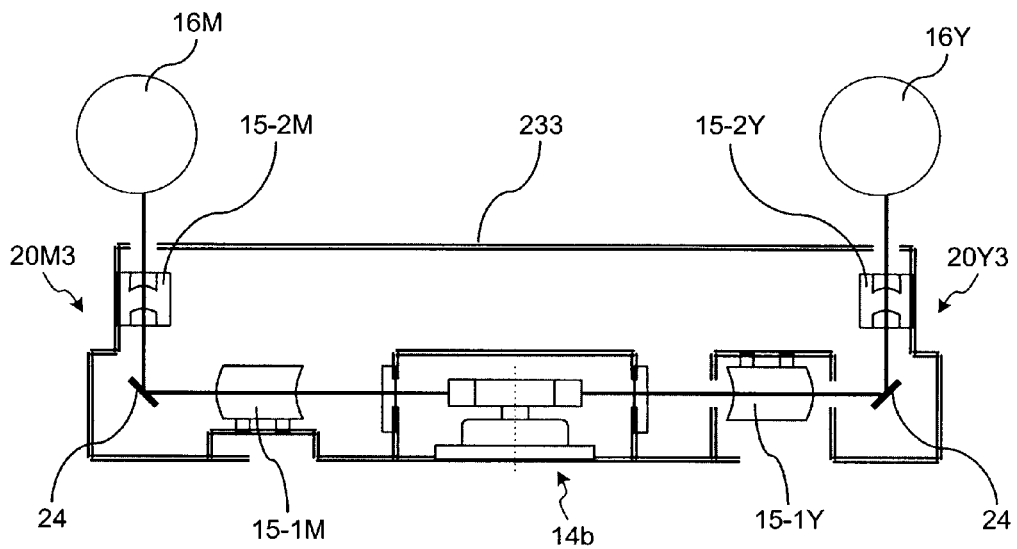
FIG. 10 is a schematic diagram of a third example of an optical scanning device.

In contrast to this, when difference in the number of folding mirrors provided in both stations is an even number, as shown in FIG. 10, one first scanning lens 15-M may be disposed on the same face side, while the other first scanning lens 15-1Y may be disposed on the opposite face side, with respect to the face where the polygon scanner 14b is installed in the optical housing 233. With this structure, curving direction of scanning lines on the photosensitive drums 16M and 16Y can be matched, so that color misregistration can be reduced ((b) in FIG. 3).

Figure 11:
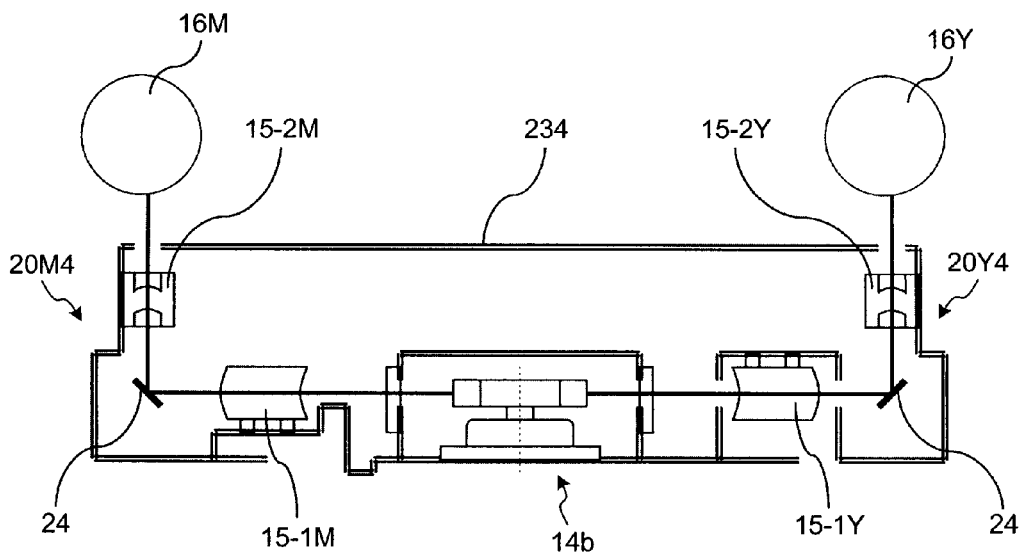
FIG. 11 is a schematic diagram of a modified example of the optical scanning device shown in FIG. 10.

More preferred structure, a modified example of the third example, is shown in FIG. 11. In FIG. 11, the shape of the optical housing 234 on the side of station M (optical scanning device 20M4) is set so that distance from the polygon scanner 14b to the first scanning lens 15-1 (distance of heat conduction along the optical housing 234) is substantially equivalent.

Figure 12:
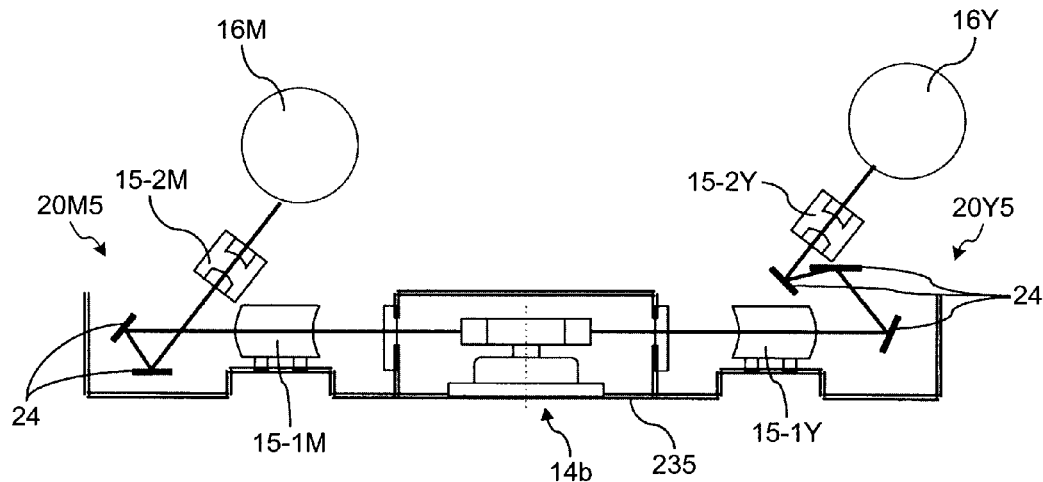
FIG. 12 is a schematic diagram of a fourth example of an optical scanning device.

The comparative example examines the case where difference in the number of folding mirrors provided in both stations is an even number. When the difference in the number of folding mirrors is an odd number for the reason of mechanical layout, the first scanning lenses 15-1M and 15-1Y can be disposed on the face side where the polygon scanner 14b is installed in the optical housing 235 shown as a fourth example in FIG. 12. In FIG. 12, the numbers of folding mirrors are two on the side of station M, and three on the side of station Y, and the difference is 1 (odd number). By setting numbers of folding mirrors to be provided so that curving direction of scanning line coincides on each photosensitive drum, it is possible to reduce color misregistration.

Since scanning-line curve on the photosensitive drum 16 is represented by the sum of component of the first scanning lens 15-1 and component of the second scanning lens 15-2, it is possible to make overall variation in scanning-line curve smaller by making at least either one of the variable component smaller. As the distance from the polygon scanner 14b to the scanning lens (distance of heat conduction along the optical housing 23) increases, influence of heat generation at the polygon scanner 14b decreases, and generation amount of the variable component can also be reduced. Although a folding mirror is never disposed between the first scanning lens 15-1 and the polygon scanner 14b, in general, it is often the case that a folding mirror is disposed between the first scanning lens 15-1 and the second scanning lens 15-2.

When a folding mirror is disposed between the first scanning lens 15-1 and the second scanning lens 15-2, distance from the polygon scanner 14b to the second scanning lens 15-2 (distance of heat conduction along the optical housing 23) should be set to be longer than the distance to the first scanning lens 15-1. With such structure, it is possible to make temperature change near the second scanning lens 15-2 smaller, so that the component of the first scanning lens 15-1 is dominant with respect to the scanning-line curve on the photosensitive drum 16, and the second scanning lens 15-2 may be installed in any manner.

Generally, in the case of a scanning optical system made up of a plurality of scanning optical elements, the scanning optical element located at a position closer to the target surface has larger power in the sub-scanning direction (along optical path of laser beam), and deterioration in straightness more largely influences on the scanning-line shape in the target surface. Therefore, it is desired to reduce heat conduction to the scanning optical element disposed near the target surface.

Figure 13:
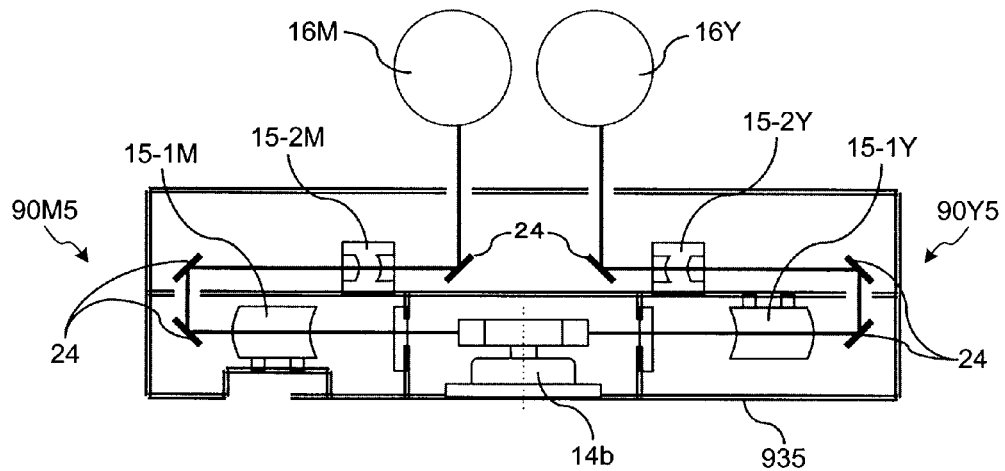
FIG. 13 is a schematic diagram of a comparative example of the optical scanning device shown in FIG. 12.

FIG. 13 depicts a comparative example of the fourth example. In the station Y (optical scanning device 90Y5), a second scanning lens 15-2Y is disposed between the polygon scanner 14b that is heat source, and the first scanning lens 15-1Y from the view point of heat conductivity within the optical housing member. Therefore, in examples of FIGS. 10 and 11, the second scanning lens 15-2Y is little influenced by heat generation at the polygon scanner 14b. However, the structure in FIG. 13 may cause some problem.

The second scanning lens 15-2M of station M (optical scanning device 90M5) is disposed at a position that is generally symmetrical to the second scanning lens 15-2Y with respect to the polygon scanner 14b, and influence of heat generation at the polygon scanner 14b is also comparable. Further, since difference in the number of folding mirror 24 disposed in the optical path after second scanning lenses 15-2M and 15-2Y in both stations M and Y is even (0 for both stations), curving direction of components of scanning lines are opposite to each other. Therefore, this structure is undesirable because of increasing color misregistration.

In the third and fourth examples and comparative examples (FIG. 8 to 12), distance from the polygon scanner 14b to the second scanning lens 15-2 is set longer than the distance to the first scanning lens 15-1, to reduce the influence of component of the second scanning lens 15-2.

When the optical scanning device as described above is employed as an exposing device of an image forming apparatus that outputs a color image by superimposing toner images formed on a plurality of photoconductors by electrophotography, on a recording medium, it is possible to obtain an output image of high quality with less color misregistration.

In a conventional image forming apparatus, by forming a toner image for detecting color misregistration that is irrelevant to an output image on an intermediate transfer belt and sensing it with a predetermined detection sensor, it is possible to detect the degree of overlapping of toner images between different stations (i.e., degree of scanning-line curve) and to adjust the writing start timing in the sub-scanning direction on the basis of the detecting results. Therefore, this can reduce the amount of color misregistration.

By further applying the optical scanning device of the embodiment to such a color image recording apparatus, it is possible to reduce occurrence of deviation of scanning-line shape caused by temperature change. Therefore, it is possible to reduce the amount of toner image for detecting color misregistration that is unnecessary for output image, and frequency of stopping job during continuous outputting is reduced, so that reduction in the number of prints can be prevented (environment-responsive).

FIG. 14 is a schematic diagram of a color image (bicolor image) forming apparatus with two stations inside the optical scanning device as shown in FIG. 1. A developing device, a transferring device, a fixing device and the like that do not enter into the present invention are not shown. As a bicolor image, for example, superimposing two color toner images of yellow (Y) having low visual sensitivity and black (K) having high visual sensitivity is assumed (superimposed on any one of the intermediate transfer belt and the recording medium or both).

The term "station" refers to an optical path and an optical element located between a light source in an optical scanning device and a target surface (photoconductor), as well as mechanical structures that support them. The light source can be a multi-beam light source, and a multi-beam scanning system that simultaneously scans one target surface with a plurality of laser beams can also be used. The station corresponding to the laser beam that is deflected and reflected at the polygon mirror 14-1 is referred to as ST1, and the station corresponding to the laser beam deflected and reflected at the polygon mirror 14-2 is referred to as ST2. The polygon scanner 14b includes the polygon motor 14a, and the two polygon mirrors 14-1 and 14-2 mounted thereon.

In FIG. 14, the laser beams emitted from a light source (not shown) such as two semiconductor lasers each are converted into generally parallel light fluxes by action of two coupling lenses (not shown) and focused as linear images that are longer in the main scanning direction (linear images focused in the sub-scanning direction) on (deflecting and reflecting surfaces of) the polygon mirrors 14-1 and 14-2 by action of two cylindrical lenses (not shown). The two laser beams deflected and reflected at the polygon mirrors 14-1 and 14-2 respectively pass through the first scanning lenses 15-1-1 and 15-1-2, and through the second scanning lenses 15-2-1 and 15-2-2, and reach two photosensitive drums 16-1 and 16-2. In the present example, each one folding mirror 24 is disposed between the first scanning lens and the second scanning lens, and the optical path of laser beam is folded so that the optical element is housed inside the optical housing 23.

The first scanning lenses 15-1-1 and 15-1-2, and the second scanning lenses 15-2-1 and 15-2-2 are preferably made of resin which allows mass production by molding (low cost) and generation of complicated surface shape (high performance).

The first scanning lenses 15-1-1 and 15-1-2 having substantially the same shape are housed in the optical housing 23 while they are aligned in the sub-scanning direction. With such a structure in which individual scanning lenses are aligned, it is possible to keep individual optical performance, especially surface shape of the optical surface accurately, and enables use in a single-station optical scanning device such as monochrome image forming apparatus.

Figure 15A:
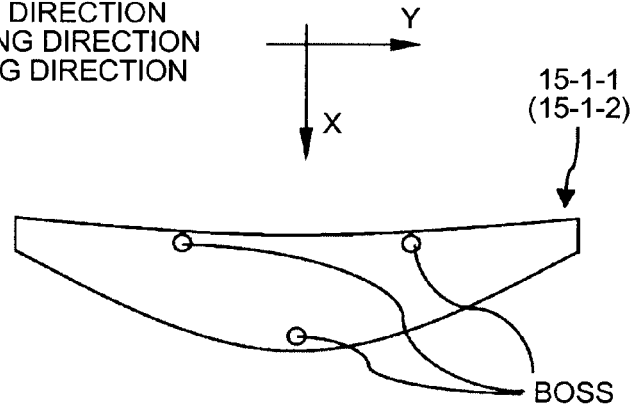
FIGS. 15A to 15C are views of a first scanning lens shown in FIG. 14.
Figure 15B:
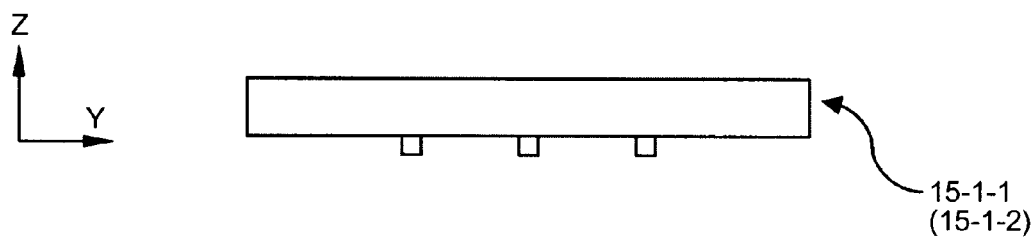
Figure 15C:
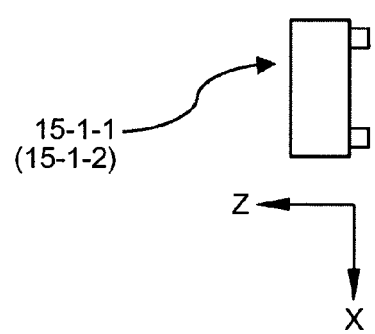

As shown in FIGS. 15A to 15C, the bottom face (back face) of the first scanning lens 15-1-1 (15-1-2) is formed with three bosses, which function as positioning unit (and reference for height) in the height direction (sub-scanning direction). As a result, it is possible to keep the height (of sub-scanning direction) from a mounting reference by forming accurately only near the bosses without molding the entire scanning lens with high accuracy even in the case of piling up in the sub-scanning direction.

Because the polygon scanner 14b rotates at such high speed as several tens of thousands of rpm, heat generated by friction at the polygon motor 14a and by windage loss at the polygon mirrors 14-1 and 14-2 transmit in the member of the optical housing 23 and reach near the first scanning lens 15-1-1 (15-1-2) [arrow in FIG. 14]. Similarly, heat reaches near the first scanning lens also from heat source outside the optical scanning device, for example, from a fixing device.

Due to the influence of heat transmitted through the member of the optical housing 23 from the polygon scanner 14b, temperature deviation arises between near the bosses (three positions) provided in the scanning lens 15-1-1 of the lower layer, and the optical housing 23 (mounting surface 30).

This temperature deviation may cause local change in optical surface shape of the scanning lens 15-1-1 near the bosses, or distribution in physical property values in the scanning lens 15-1-1, for example, refractive index, and for this reason, shape of the scanning line (scanning-line curve) on the photosensitive drum 16-1 in station ST1 changes. When a toner image is formed in such a station (photosensitive drum), the resultant image is of low quality. The influence is significant particularly in the case of color component having high visual sensitivity (black toner), so that it is important for the station containing the first scanning lens 15-1-1 to be compatible to a color component having low visual sensitivity (yellow toner) for obtaining an image of high quality.

In the case of such a bicolor image, change in one shape of the scanning lines results in color misregistration. Therefore, the necessity of selecting a station from the level of visual sensitivity is small. However, even in a bicolor image forming apparatus, image outputs are often conducted in a single color (black) having higher visual sensitivity, for example, for image of characters, so that it is desired to realize high quality of image of the color component having high visual sensitivity.

Since the scanning lens 15-1-2 is overlaid on the scanning lens 15-1-1, the scanning lens 15-1-1 made of resin functions as heat insulating member, temperature deviation between the scanning lenses 15-1-1 and 15-1-2 is so small that it is not be substantially problematic. As described later, although there is influence of natural convection inside the optical housing 23, the effect of heat transmission in the optical housing member is more significant in the case of a metallic optical housing.

In the foregoing, the structure in which two stations are aligned (two stages) in the sub-scanning direction in an optical path at least from the polygon mirror to the first scanning lens is explained. However, structures having three or more stages can be applied. An example of such structure is explained below.

Figure 16:
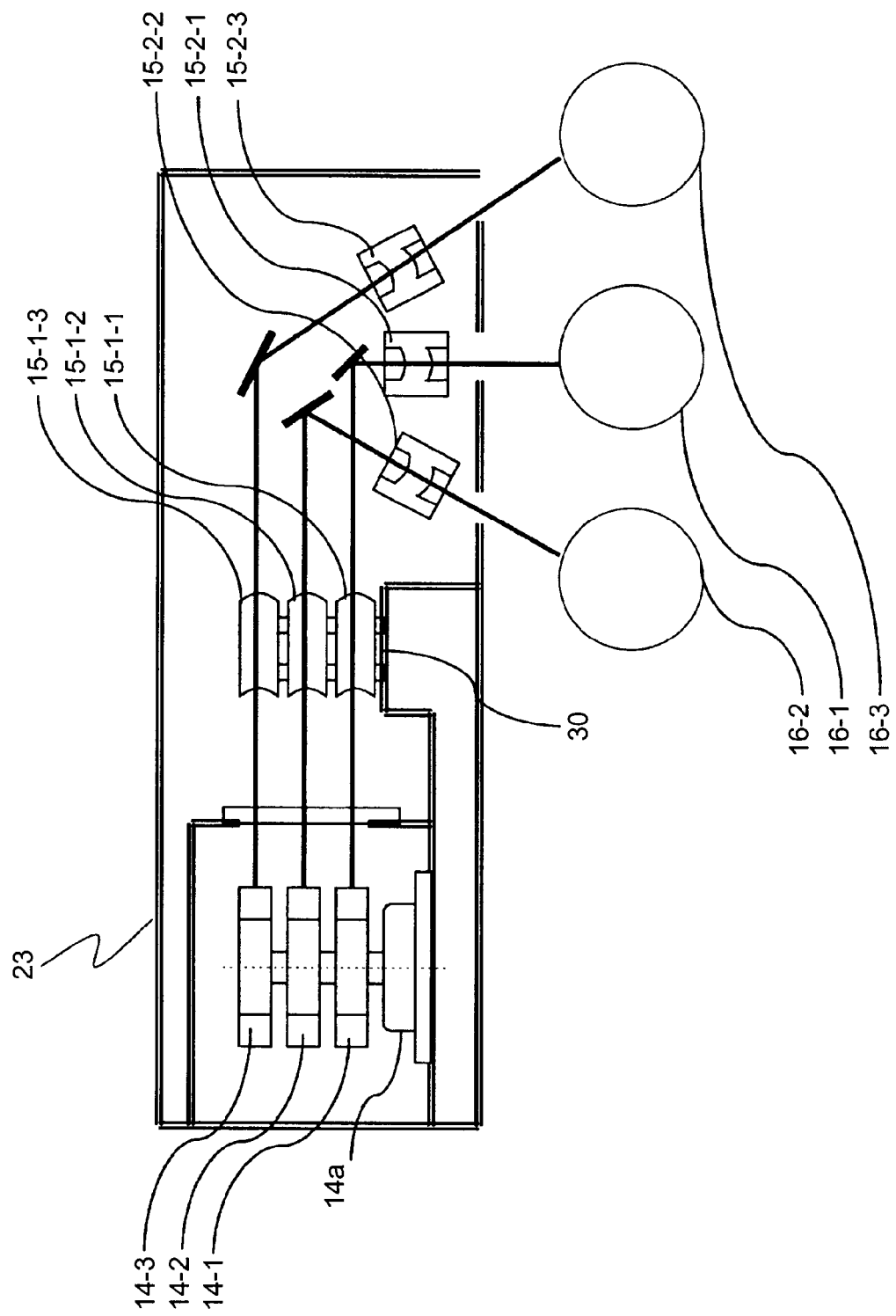
FIG. 16 is a schematic diagram of a first example of an image forming apparatus.

FIG. 16 depicts part of a tricolor image forming apparatus of a first example. The polygon scanner 14b in FIG. 16 includes the polygon motor 14a and three polygon mirrors 14-1, 14-2 and 14-3 mounted thereon. The station corresponding to the laser beam deflected and reflected at the polygon mirror 14-1 is referred to as ST1, the station corresponding to the laser beam deflected and reflected at the polygon mirror 14-2 is referred to as ST2, and the station corresponding to the laser beam deflected and reflected at the polygon mirror 14-3 is referred to as ST3.

Likewise the case of the bicolor image forming apparatus (color image forming apparatus) in the fifth example, heat generated at the polygon scanner 14b (or fixing device, etc.) transmits in the member of the optical housing 23 and reaches near the first scanning lens. The heat transmits to the scanning lenses 15-1-2 and 15-1-3 via the scanning lens 15-1-1 (of lowermost layer) which contacts the optical housing 23 (mounting surface 30), of the first scanning lenses.

As a result, as described previously, temperature deviation arises between the optical housing 23 (mounting surface 30) and the scanning lens 15-1-1, and local temperature deviation arises near boss parts of the scanning lens 15-1-1, so that the scanning-line shape of this station (ST1) largely changes. On the other hand, since the scanning lens 15-1-1 in the lowermost layer functions as a heat insulating member, temperature deviations between 15-1-1 and 15-1-2, and between 15-1-2 and 15-1-3 are so small that they do not cause substantial problem.

Since quality of image that is formed in the photosensitive drum 16-1 corresponding to ST1 is more likely to deteriorate than those formed in stations ST2 and ST3, it is preferred to make toner of a color component having low visual sensitivity into correspondence with ST1. On the other hand, it is preferred to make toner of a color component having high visual sensitivity into correspondence with station ST2 or ST3. For example, when the three colors are formed of toner of black (K), cyan (C) and yellow (Y), yellow toner having lowest visual sensitivity may be made into correspondence with station ST1.

Similarly, a tetra-color image forming apparatus can be constructed by piling up four first scanning lenses and adding toner of magenta (M) to the three colors. Also in this case, yellow toner having lowest visual sensitivity may be made into correspondence with station ST1. Note that an image forming apparatus for images of more colors can be achieved in a similar manner.

As described later, since natural convection occurs inside the optical housing, the scanning lens in the uppermost layer is exposed to air flow of relatively high temperature. As a result, the scanning-line shape corresponding to the scanning lens in the uppermost layer (lesser extent to the lowermost layer) may simultaneously change. Therefore, more preferred structure is to make the color component having the highest visual sensitivity (usually black toner) into coincidence with an intermediate layer other than the uppermost layer and the lowermost layer.

In this manner, since visible deterioration of color image quality due to color misregistration can be effectively suppressed, it is possible to reduce the frequency of detecting color misregistration from the degree of overlapping of toner images of each colors compared to a conventional image forming apparatus (environment-responsive).

Figure 17:
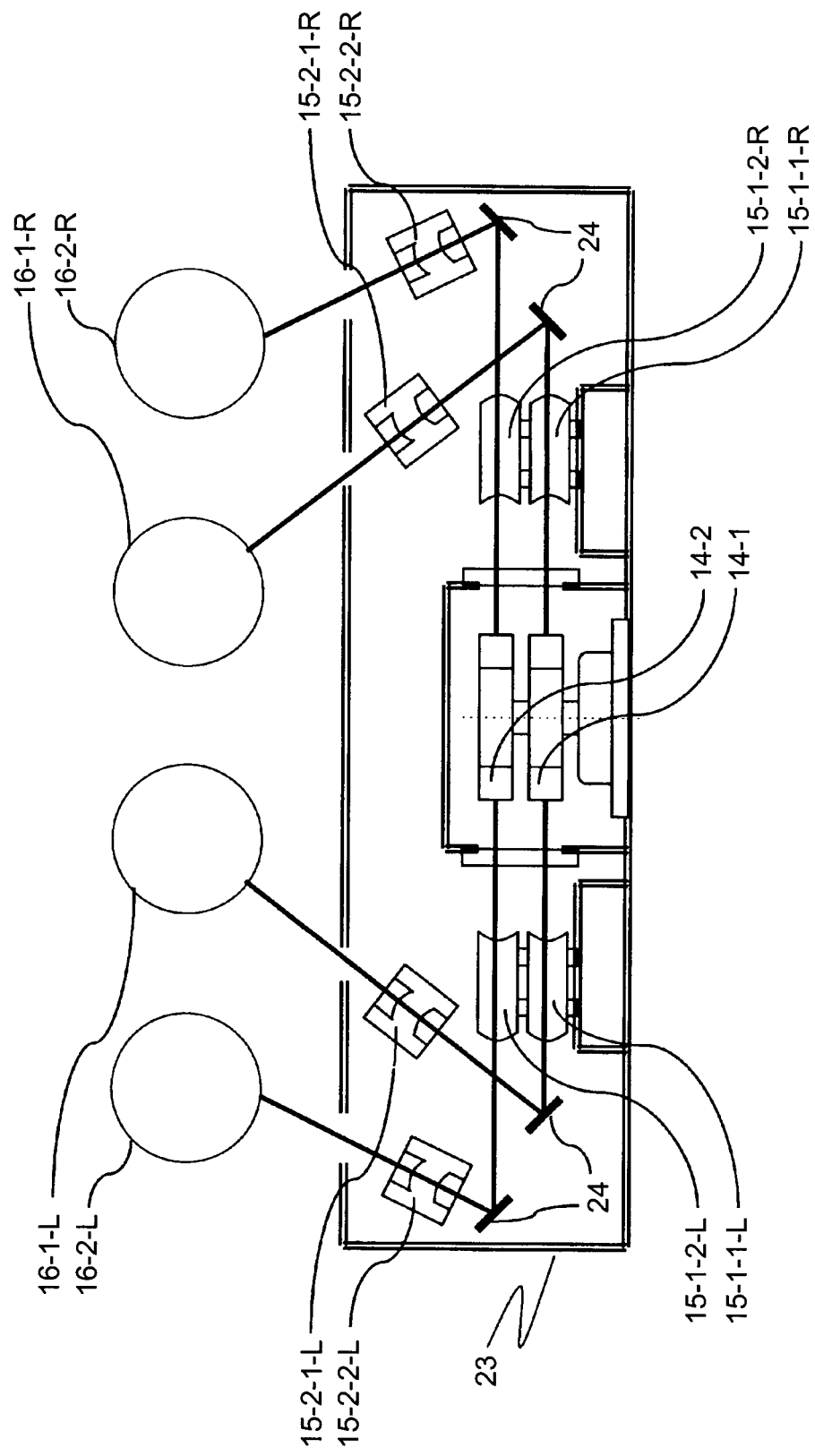
FIG. 17 is a schematic diagram of a second example of an image forming apparatus.
Figure 18:
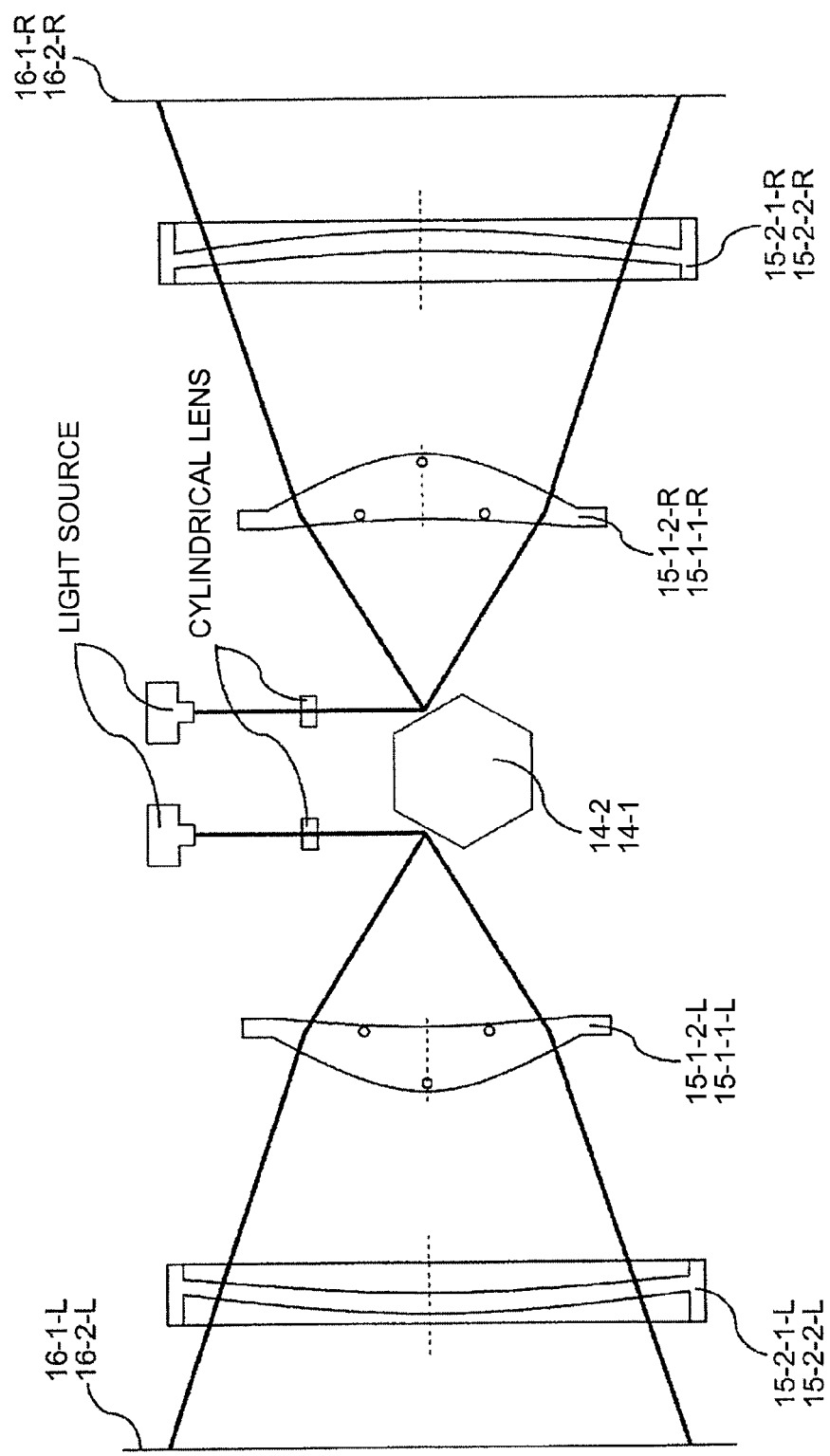
FIG. 18 is a top view of the image forming apparatus shown in FIG. 17.

FIGS. 17 and 18 depict part of a tetra-image forming apparatus of a second example. It is assumed that toner of four colors, for example, black (K), magenta (M), cyan (C), and yellow (Y) are superimposed.

As shown in FIG. 17, for miniaturization of optical scanning device, and limitation of mechanical layout such as photosensitive drum interval in the image forming apparatus, each station is provided with one folding mirror 24 for folding optical path of laser beam. FIG. 18 is an exploded plan view of optical layout without folding mirror where the stations ST1-L and ST2-L, the stations ST1-R and ST2-R are disposed symmetrically on the right and left sides about the polygon mirror 14.

Also in FIG. 18, likewise the case as previously described, the heat generated at the polygon scanner 14b, a fixing device or the like transmits in the member of the optical housing 23, and reaches near the first scanning lens. The heat transmits to the scanning lenses 15-1-2-R (15-1-2L) via the scanning lens 15-1-1R (15-1-1-L) (of the lower layer) contacting the optical housing 23 (mounting surface 30), of the first scanning lenses 15-1-1R, 15-1-1-L, 15-1-2-R and 15-1-2-L. Although temperature deviation arises between the scanning lens 15-1-1-R (15-1-1-L) in the lower layer and optical housing 23, temperature deviation between the scanning lens 15-1-2-R (15-1-2-L) in the upper layer and the scanning lens 15-1-1-R (15-1-1-L) in the lower layer is too small to substantially cause a problem. Therefore, by disposing a photosensitive drum for yellow toner having the lowest visual sensitivity in a station, on lower layer side of the first scanning lens (ST1-R or ST1-L) and disposing a photosensitive drum for black toner having the highest visual sensitivity in a station, on upper layer side of the first scanning lens (ST2-R or ST2-L), it is possible to visually reduce the influence of color misregistration caused by change in scanning-line shape due to temperature change.

Figure 19:
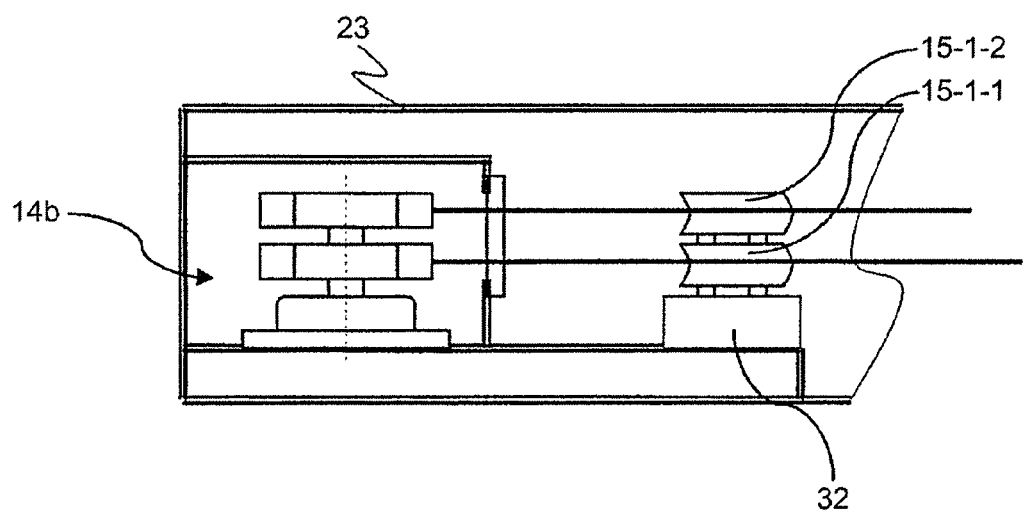
FIG. 19 is a schematic diagram of relevant parts of a third example of an image forming apparatus.

FIG. 19 depicts part of a bicolor image forming apparatus of a third example. A heat insulating member 32 is arranged between the first scanning lens 15-1-1 and the optical housing 23 that satisfies:

$$H/\kappa > 0.008$$

where H [m] is thickness of heat-insulating base material, and κ [W/(m·K)] is heat conductivity of insulating base material. Even when the optical housing 23 is made of metal having high heat conductivity, heat of the optical housing 23 cannot be transmitted to the first scanning lens 15-1-1 because of the heat insulating member 32, and temperature distribution is not likely to occur near a boss part of the first scanning lens 15-1-1.

For example, in the heat insulating member 32 made of resin (PET+30% glass fiber), since heat conductivity κ is generally 0.4 [w/(m·K)], thickness of the heat insulating member H may be selected so that H=0.0032 (meter)=3.2 (millimeter) is satisfied.

In the Case of an Optical Housing Made of Resin

In the foregoing, the case where the optical housing is made of metal having high heat conductivity is explained. In this section, the case where the optical housing is made of resin having low heat conductivity is explained.

Figure 20:
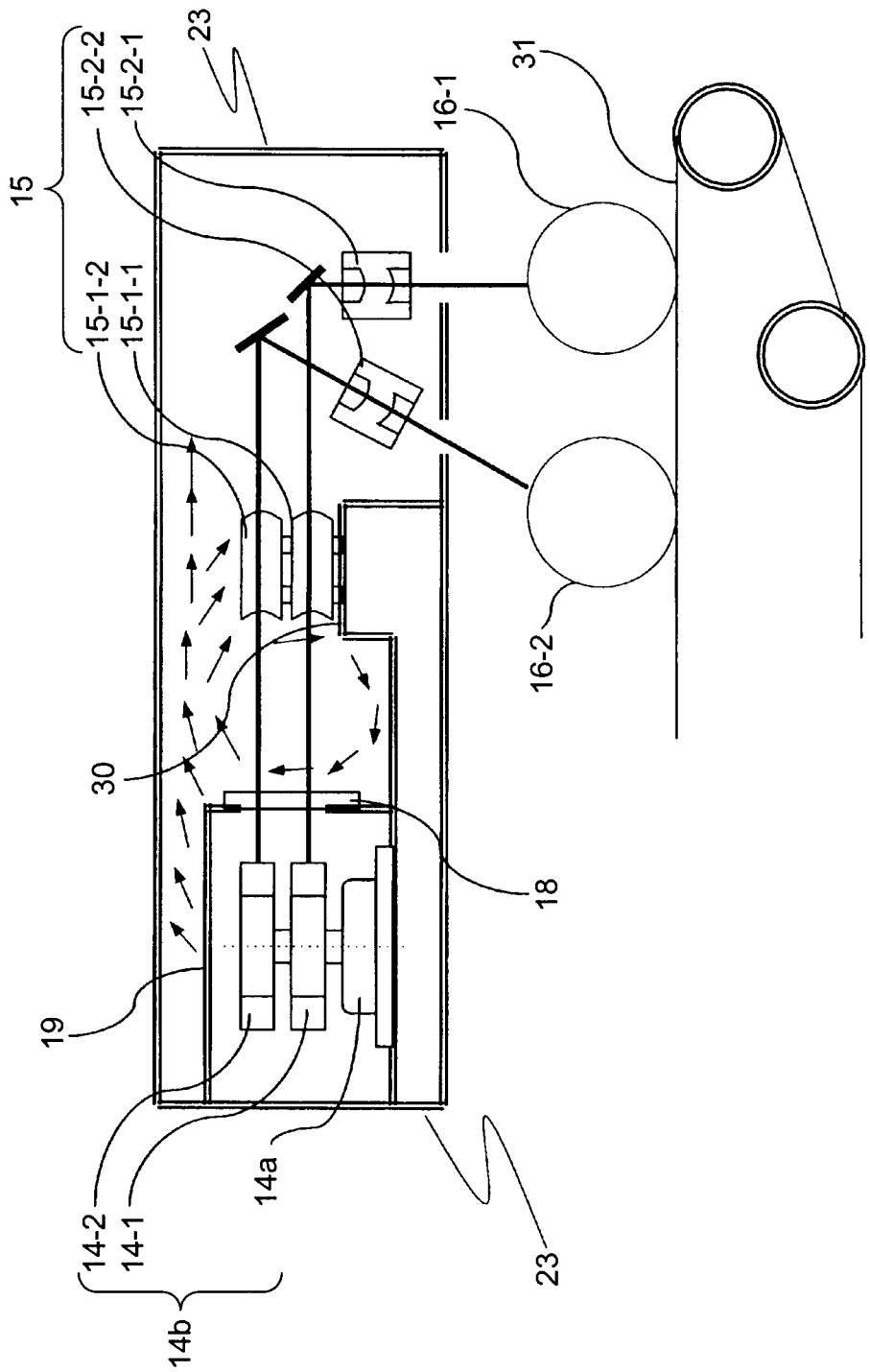
FIG. 20 is a schematic diagram of a fourth example of an image forming apparatus.

An image forming apparatus shown in FIG. 20 as a fourth example are of basically the same as that shown in FIG. 14 except that the optical housing 23 is made of resin in FIG. 20. Accordingly, the soundproof glass 18 and the wall 19 are disposed to surround the polygon scanner 14b, so that heat generated at the polygon scanner 14b does not diffuse together with air flow with rotation of the polygon mirrors 14-1 and 14-2, and since the optical housing 23 is made of a material having low heat conductivity, the distance of diffusion due to heat conductivity in the member of the optical housing is very small compared to the case of metallic optical housing.

Also in FIG. 20, heat generated due to rotation of the polygon scanner 14b transmits inside the optical housing 23 by natural convection from the chamber (region) surrounded by the soundproof glass 18 and the wall 19. Convection represented by the arrows in FIG. 20 generates, and as a result, temperature change starts from the top face side of the scanning lens 15-1-2 disposed on the upper side in FIG. 20 (in the direction opposite to the gravity acceleration vector) of the first scanning lenses 15-1-1 and 15-1-2. Therefore, temperature distribution occurs inside the scanning lens 15-1-2, and shape of the scanning line on the photosensitive drum of station corresponding to this scanning lens changes, leading deterioration in image quality.

Figure 21:
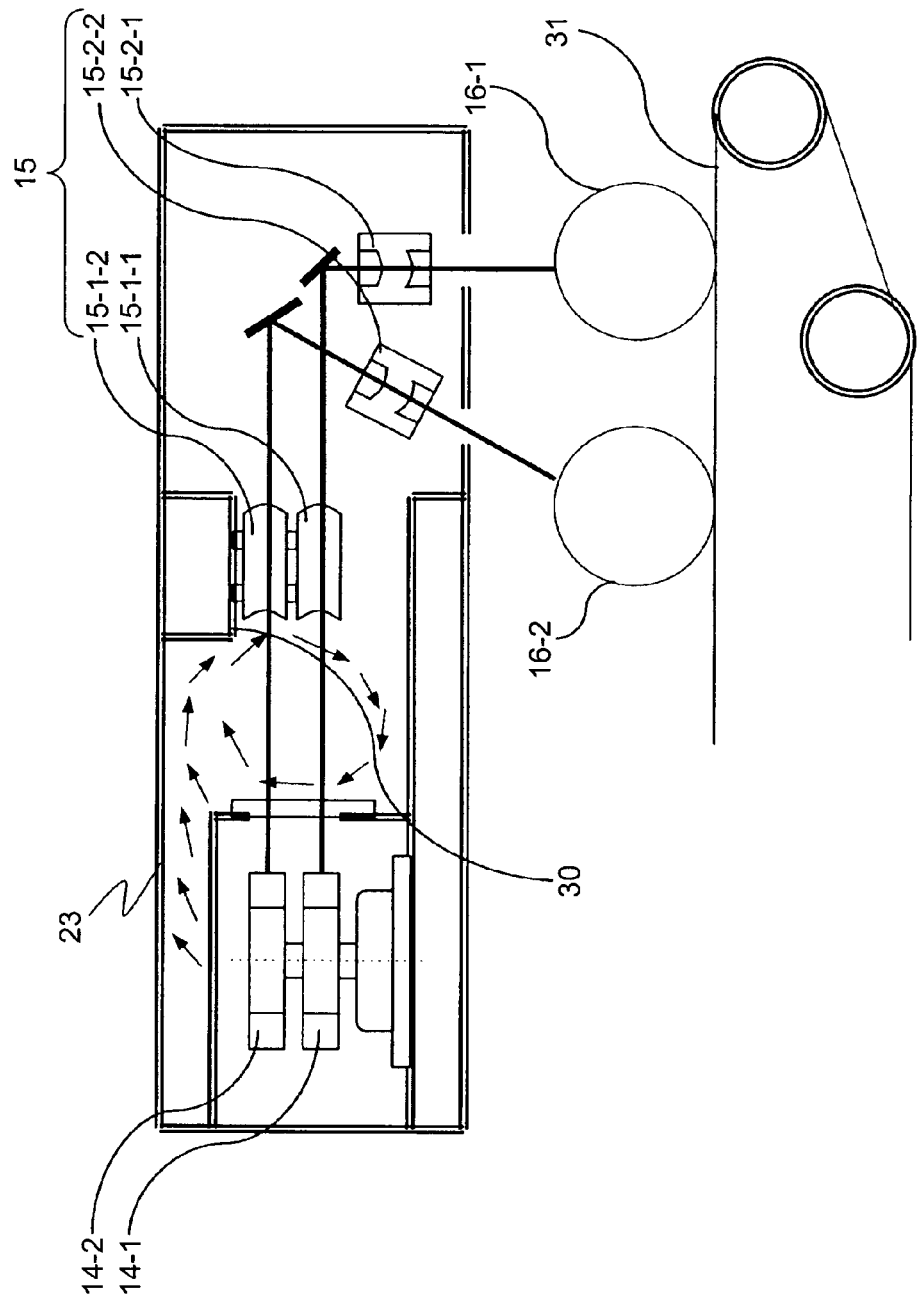
FIG. 21 is a schematic diagram of a modified example of the image forming apparatus shown in FIG. 20.

FIG. 21 is a modified example of the fourth example. Also in this case, natural convection arises inside the optical housing 23 made of resin, and the scanning lens 15-1-2 disposed on the upper side with respect to the direction of the gravity is exposed to air flow of relatively high temperature, so that shape of the scanning line on the photosensitive drum of station corresponding to the scanning lens 14-2 changes, leading deterioration in image quality.

Therefore, in both structures shown in FIGS. 20 and 21, it is preferred that when the optical housing is made of resin, an image of color component having low visual sensitivity is formed on the photoconductor of the station corresponding to the side of the scanning lens 15-1-2 disposed on the upper side with respect to the direction of the gravity.

Figure 22:
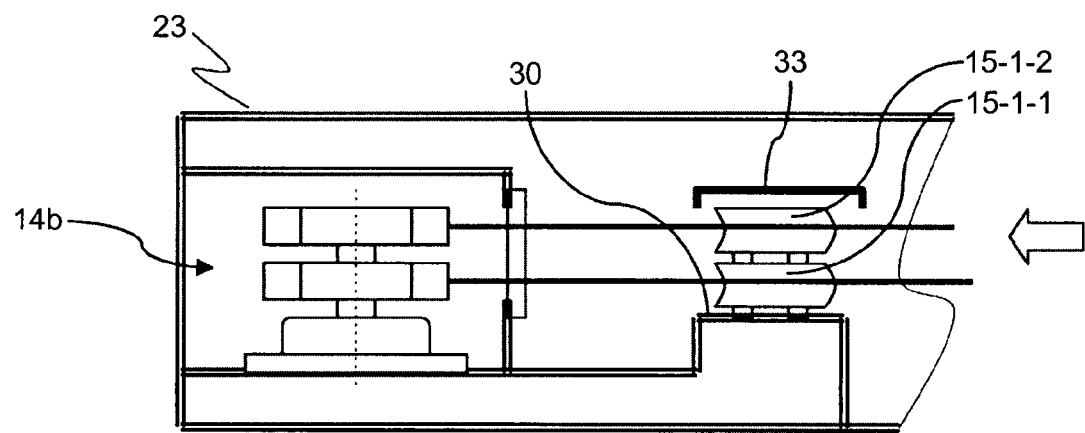
FIG. 22 is a schematic diagram of relevant parts of a fifth example of an image forming apparatus.

As shown in FIG. 22 for explaining a fifth example, by disposing a cover 33 over the first scanning lens 15-1-2 in the structure of FIG. 20, it is possible to prevent the air flow due to natural convection inside the optical housing 23 (air warmed by heat generated at the polygon scanner 14b) from coming into direct contact with the scanning lens 15-1-2. As a result, it is possible to reduce occurrence of temperature distribution inside the scanning lens 15-1-2.

When a scanning lens made of resin having relatively large coefficient of thermal expansion is housed in an optical housing made of material having relatively small coefficient of thermal expansion (such as aluminum), it is preferred to secure the scanning lens under pressure by a spring. By employing such structure, free expansion of scanning lens is not prevented when temperature of the optical scanning device changes, so that it is possible to prevent the scanning-line curve from changing.

Figure 23:
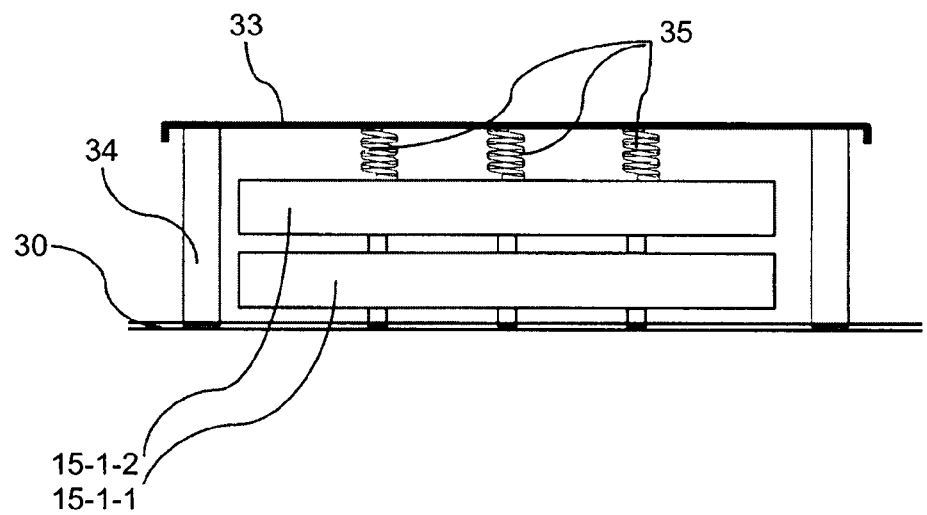
FIG. 23 is a schematic diagram of relevant parts of a sixth example of an image forming apparatus.

FIG. 23 is a schematic diagram of relevant parts of a sixth example of an image forming apparatus viewed from the arrow in FIG. 22, and springs 35 (three positions) are disposed between the cover 33 and the scanning lens 15-1-2 explained in FIG. 22. It is preferred for assemblability and assembling accuracy, to integrally form the spring 35 with the cover 33. It is preferred that the springs 35 are disposed at the positions opposing to the bosses provided in the first scanning lenses 15-1-1, 15-1-2 (FIG. 23). This is because if the points of action of the springs 35 are misaligned from the positions of bosses, deformation of the first scanning lenses 15-1-1, 15-1-2 may occur.

When heat generation amount at the polygon scanner 14b is large and the optical housing is made of metal having high heat conductivity, a large amount of heat transmits through the member and reach the first scanning lens, so that the measures described in the embodiments are sometimes inadequate. When the optical housing is made of resin having low heat conductivity, the influence of natural convection inside the optical housing may affect not only on the scanning lens on the upper layer side but also on the scanning lens of the lower layer side.

In such a case, for example, as described in FIG. 14, by disposing folding mirrors (number) so that curving direction of components of scanning lines generated on the first scanning lenses 15-1-1 (lower layer) and 15-1-2 (upper layer) match on the photosensitive drums 16-1 and 16-2, it is possible to reduce color misregistration. At this time, difference in the number of folding mirrors between upper and lower layers is an even number.

Figure 24:
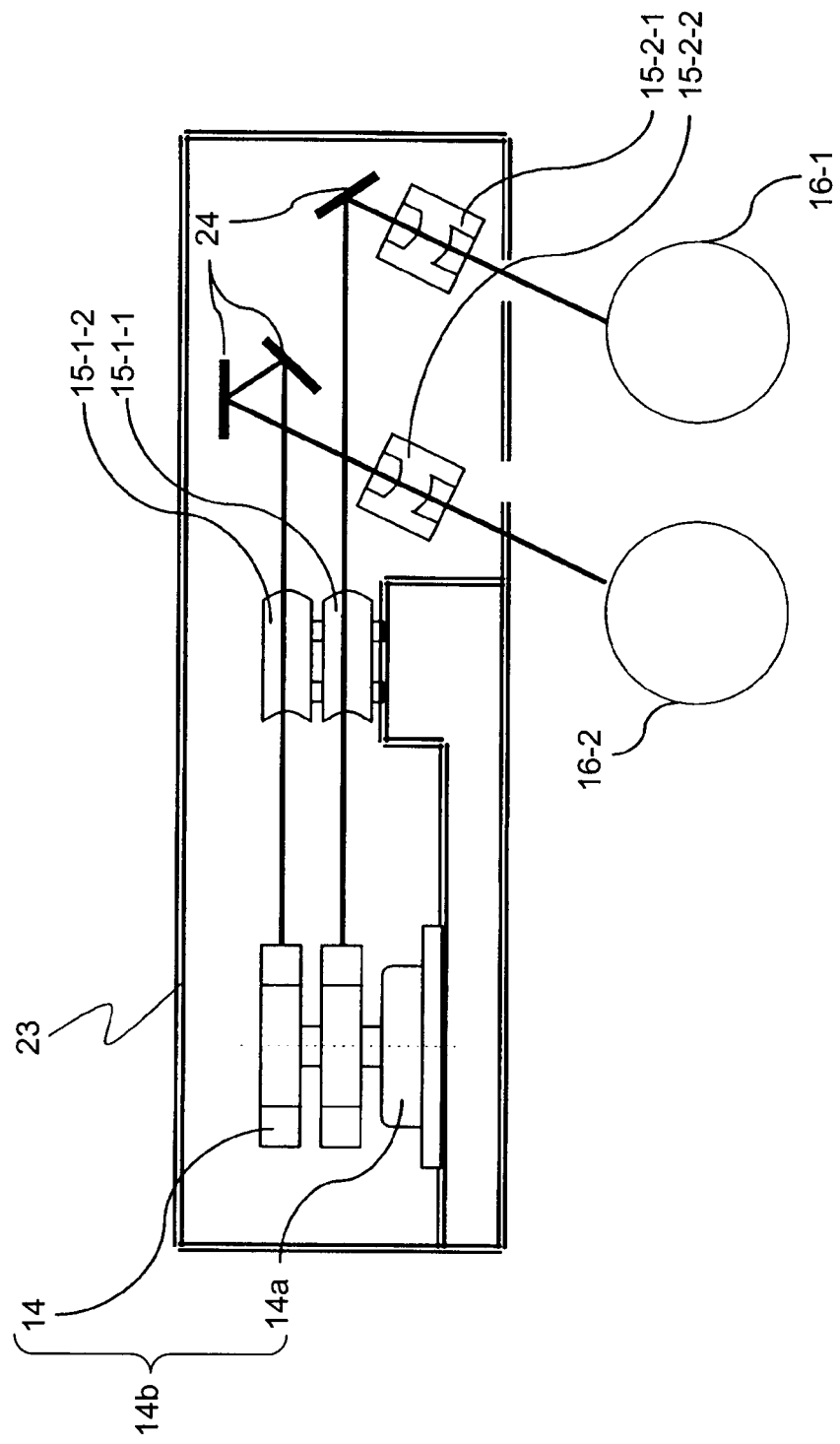
FIG. 24 is a schematic diagram of a comparative example of the image forming apparatus.

In contrast, in a comparative example of FIG. 24, which is a comparative example, since the curving direction of components of scanning lines generated on the first scanning lenses 15-1-1 (lower layer) and 15-1-2 (upper layer) are opposite to each other on the photosensitive drums 16-1 and 16-2, the amount of color misregistration increases and quality of color image is deteriorated. At this time, difference in the number of folding mirrors between upper layer and lower layer is an odd number.

Figure 25:
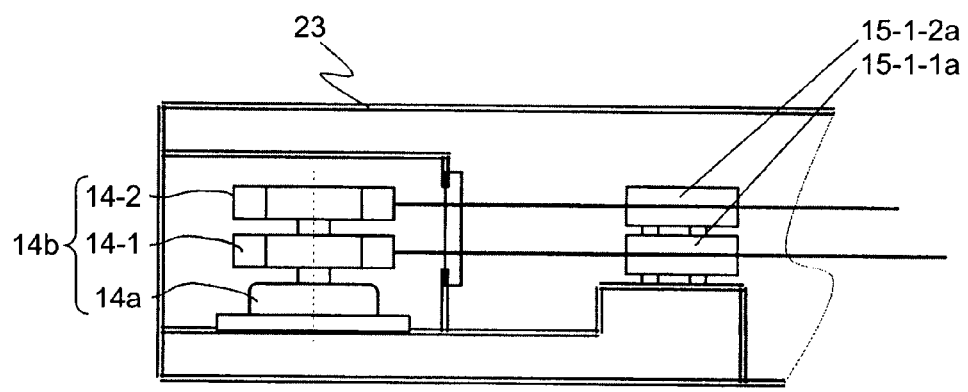
FIG. 25 is a schematic diagram of relevant parts of an seventh example of an image forming apparatus.

Part of a bicolor image forming apparatus (color image forming apparatus) of a seventh example is shown in FIG. 25. In the image forming apparatus of the present example, curvature in the sub-scanning direction of the optical surface (any one of incident side and exit side or both) of the first scanning lenses 15-1-1a and 15-1-2a is zero (radius of curvature is 8) in the structure shown in FIG. 14.

In this manner, by employing the structure in which curvature of at least either of the incident side or exist face side of the first scanning lenses 15-1-1a and 15-1-2a is zero, even when the heat generated at the polygon scanner 14b transmits inside the member of optical housing and reaches the lower stage of the first scanning lens 15-1-1a, and leads local change in shape of optical surface near a boss, and distribution in physical property values (for example, refractive index) inside the scanning lens 15-1-1a, it is possible to reduce the influence compared to the structure in which curvature of optical surface is not zero.

Even when incident position of laser beam into the first scanning lenses 15-1-1a and 15-1-2a (sub-scanning direction) deviates due to variations in parts and mounting tolerance such as light source, cylindrical lens, first scanning lenses 15-1-1a and 15-1-2a themselves, it is possible to reduce deterioration of optical performance in the target surface because the curvature of optical surface is zero. It is more effective to make curvatures of the incident side and exit side of the first scanning lenses 15-1-1a and 15-1-2a be zero and to make refractive index of the optical element be zero.

Figure 26:
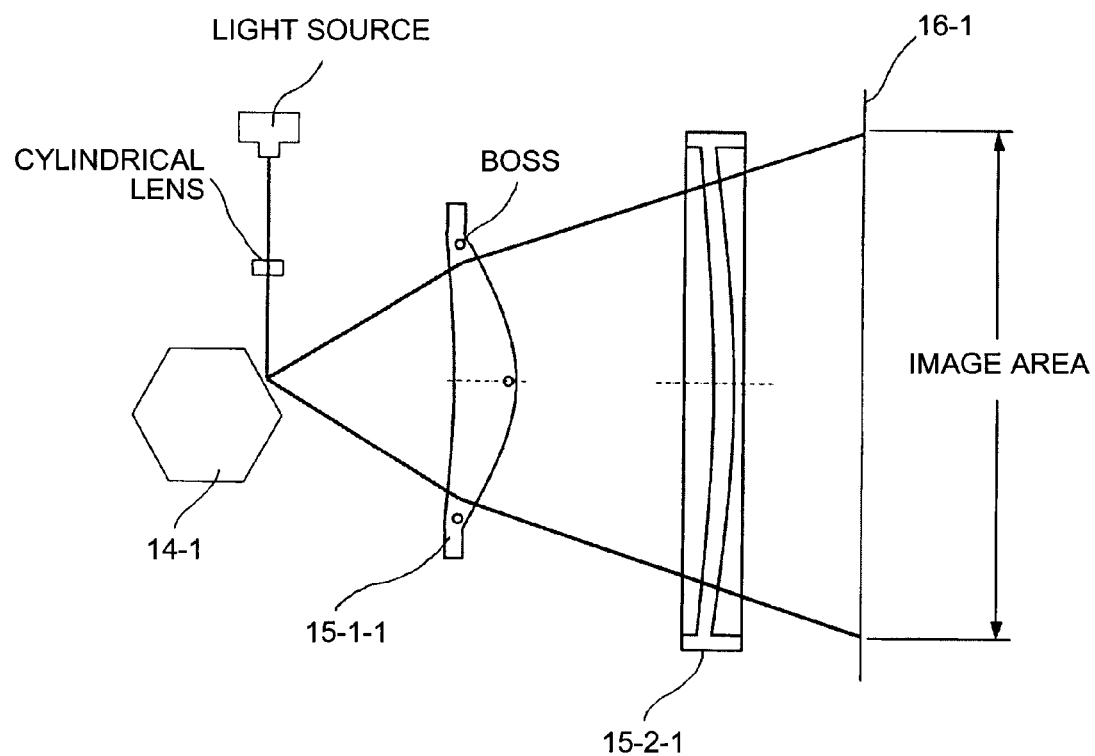
FIG. 26 is an exploded plan view of an optical path from a polygon mirror to a photosensitive drum in an eighth example of an image forming apparatus.
Figure 27A:
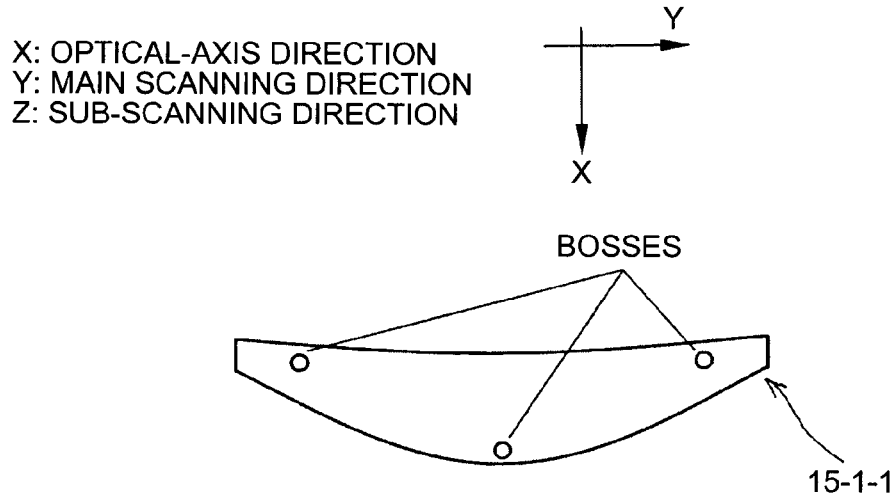
FIGS. 27A to 27C are views of a first scanning lens shown in FIG. 26.
Figure 27B:
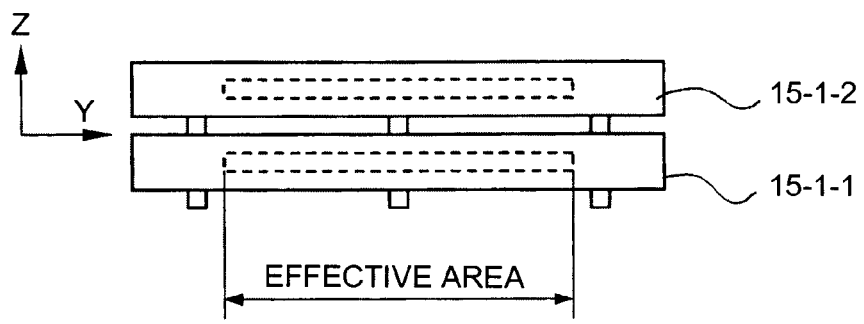
Figure 27C:
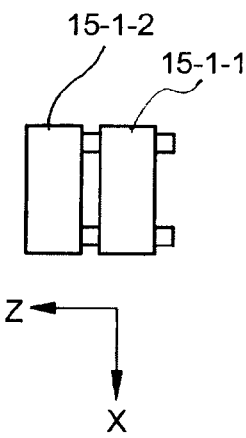
Figure 28:
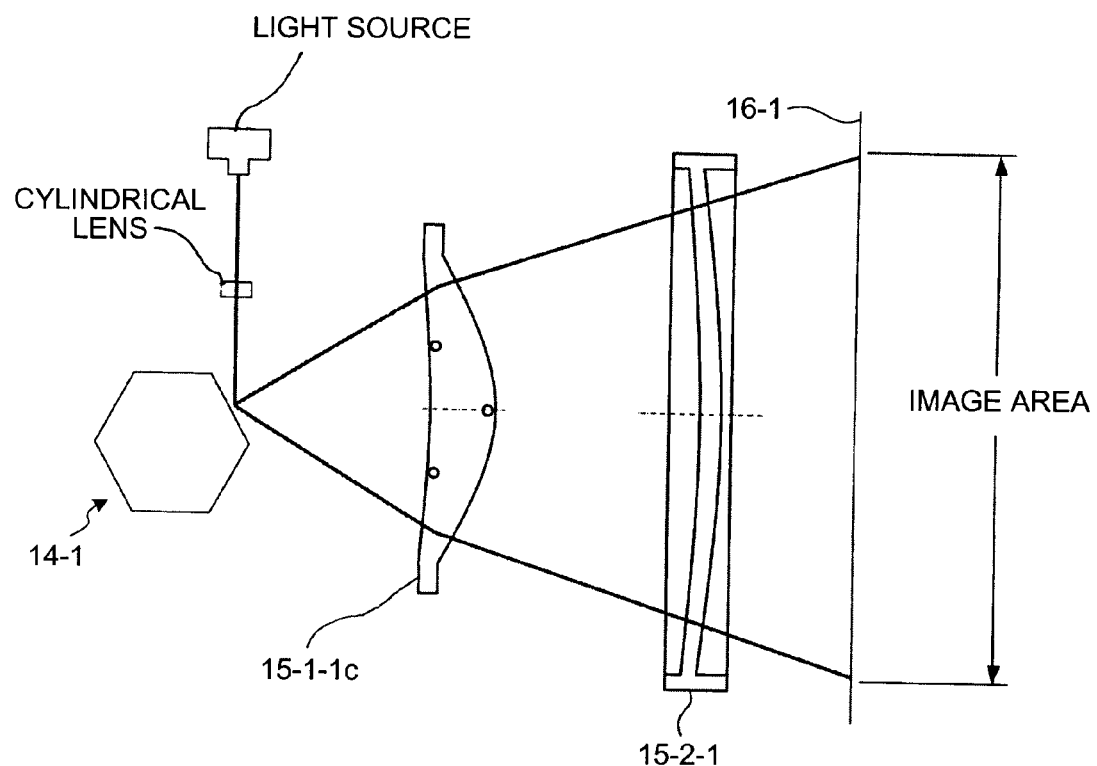
FIG. 28 is exploded plan view of an optical path from a polygon mirror to a photosensitive drum in a comparative example for the image forming apparatus shown in FIG. 26.
Figure 29A:
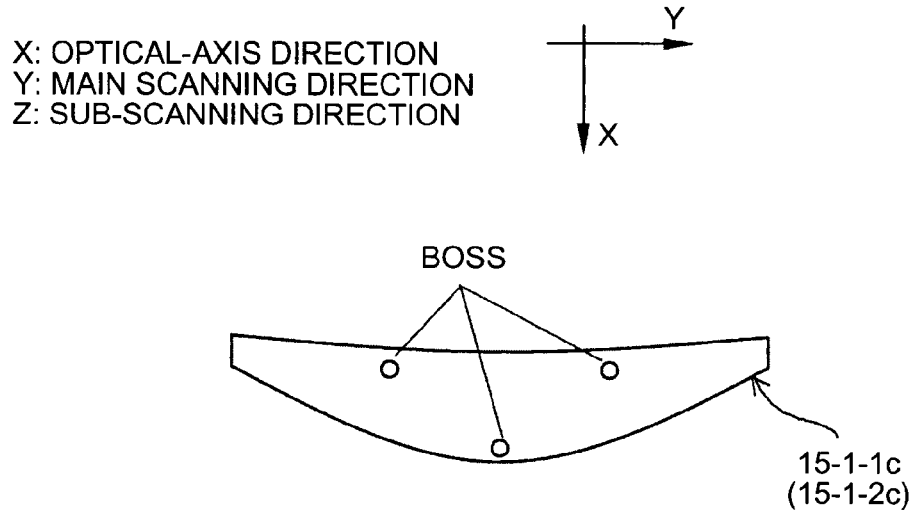
FIGS. 29A to 29C are views of a first scanning lens shown in FIG. 28.
Figure 29B:
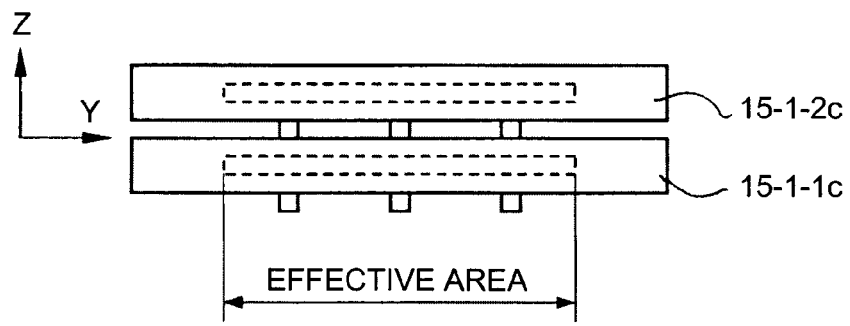
Figure 29C:
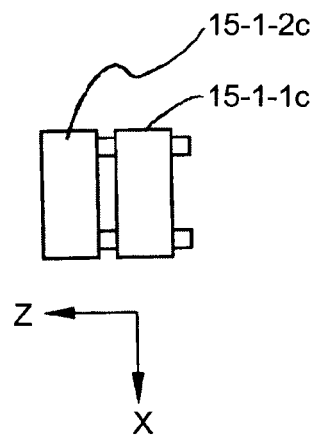

FIG. 26 is an exploded plan view (top view) of an eighth example of an optical path (on the side of station ST1) from the polygon mirror 14-1 to the surface of the photosensitive drum 16-1 in FIG. 14. The positions where bosses are disposed in the first scanning lens 15-1-1 (three positions) are shown in FIGS. 27A to 27C (three-side view).

FIGS. 28 and 29A to 29C depict comparative examples of the eighth example. In the eighth example (FIG. 26, FIGS. 27A to 27C), two bosses provided on both sides in the main scanning direction of the first scanning lens 15-1-1 are disposed outside the main scanning direction of an effective area. On the other hand, in the comparative examples (FIG. 28, FIGS. 29A to 29C), two bosses provided on both sides in the main scanning direction of the first scanning lens 15-1-1 are disposed inside the main scanning direction of the effective area.

Figure 30A:
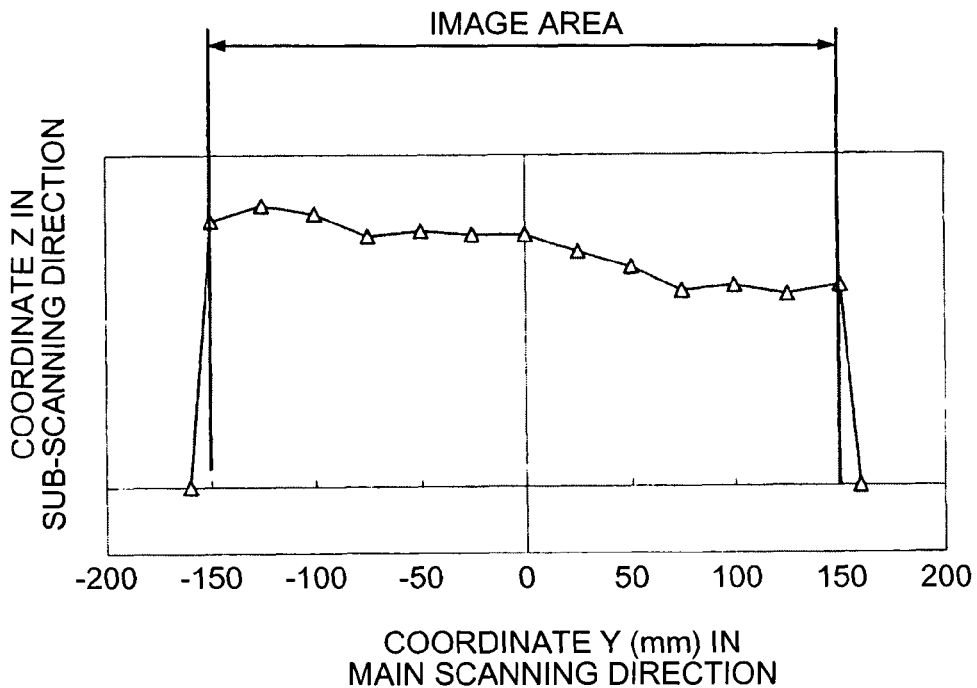
FIGS. 30A and 30B are graphs of change in scanning-line shape caused by temperature rise along with the rotation of a polygon scanner shown in FIG. 26.
Figure 30B:
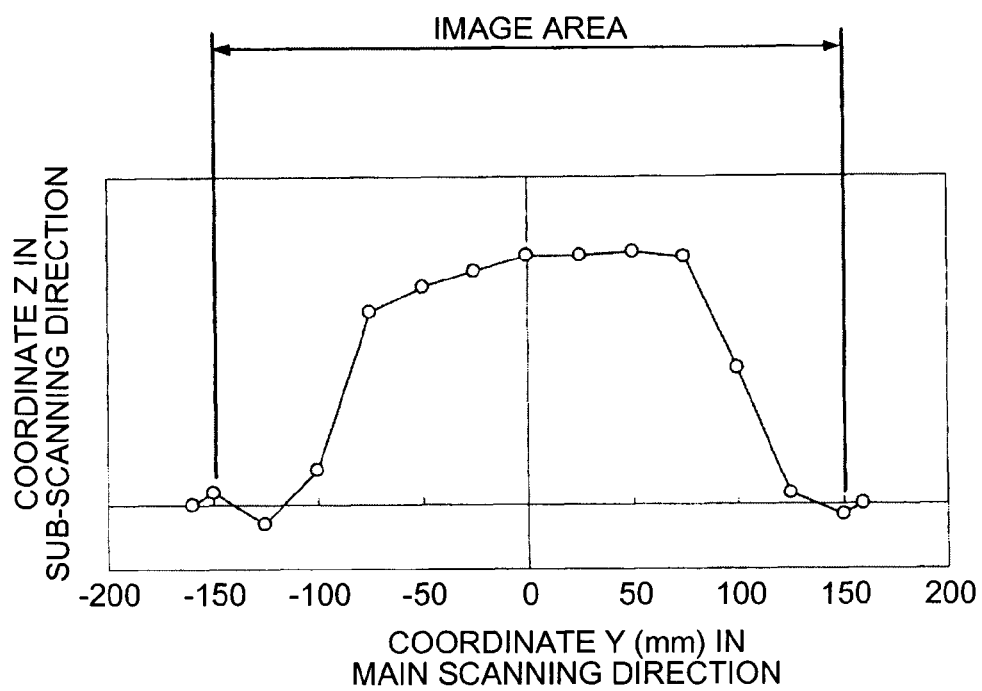

Change in scanning-line shape (photosensitive drum 16-1 surface) caused by temperature rise of the apparatus due to heat generation caused by rotation of the polygon scanner 14b in the present example is shown in FIGS. 30A and 30B. FIG. 30A is for the case of structure of the eighth example (FIG. 26, FIGS. 27A to 27C), and FIG. 30B is for the case of structure of the comparative example (FIG. 28, FIGS. 29A to 29C). Assumed size of output image is "A3", and width of image area is 300 millimeters (Y=±150 millimeters or less).

In the case of the comparative example (FIG. 30B), the laser beam passing near the bosses of the first scanning lens 15-1-1c (two positions on both sides) reaches near the coordinate of Y=±100 millimeters in the photosensitive drum 16-1, so that the scanning-line shape drastically changes near the coordinate Y=±100 millimeters (within image area). In the case of application to two or more color polychromatic image, if the degree of change in scanning-line shape differs between stations, or the curving direction of scanning lines are opposite due to difference in the number of provided folding mirrors, color misregistration occurs in an output image.

On the other hand, in the case of the eighth example (FIG. 30A), since the laser beam passing near bosses of the first scanning lens 15-1-1 (two positions on both sides) corresponds near the coordinate Y=±160 millimeters outside the image area in the photosensitive drum 16-1, it is possible to reduce change in scanning-line shape in the image area. Further, shift in the sub-scanning direction of the scanning line position can be compensated, for example, in the following manners:

Adjust starting timing of scanning in the sub-scanning direction.

Adjust rotation phase of photosensitive drum.

Separately provide an optical path deflecting element, and deflect the light path at a very small angle in the sub-scanning direction, thereby suppressing occurrence of color misregistration in an output image.

Figure 31:
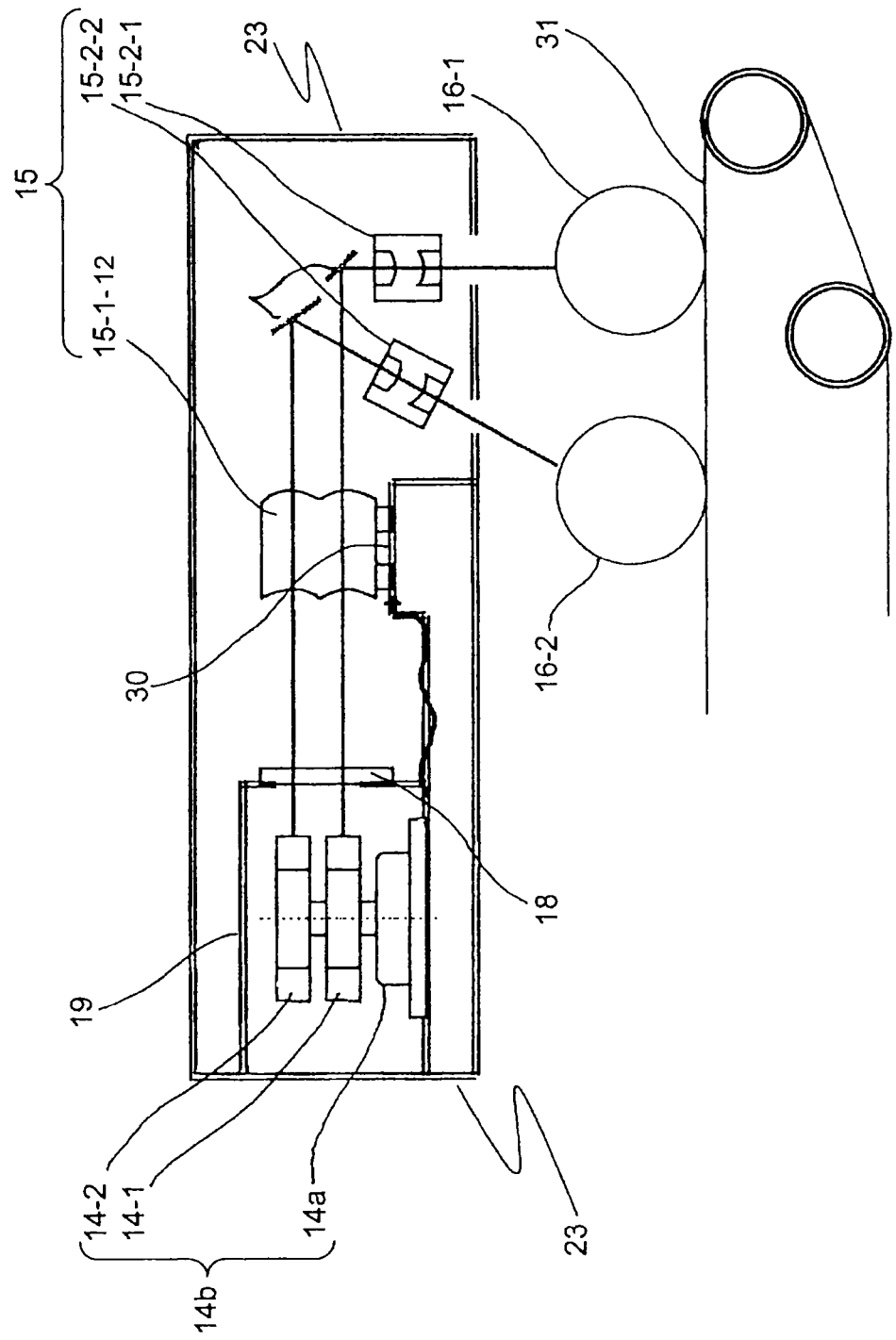
FIG. 31 is schematic diagram of a ninth example of an image forming apparatus.

A structure of a bicolor image forming apparatus (color image forming apparatus) of a ninth example is shown in FIG. 31. Unlike the case of the fifth example (FIG. 14), a single first scanning lens 15-1-12 (focusing element a) is shared by two stations ST1 and ST2. In this structure, heat generated at the polygon scanner 14b transmits inside the optical housing member as indicated by the arrow, and reaches the first scanning lens 15-1-12 via the mounting surface 30, and forms continuous temperature distribution inside the first scanning lens 15-1-12. On the other hand, in the case of the fifth example, double-layered structure is employed, so that temperature distribution is intermittent (discontinuous) between the lower stage 15-1-1 and the upper stage 15-1-2 of first scanning lens. This difference in phenomenon is significant at the time of transition of temperature change. Therefore, in the present example, it is possible to reduce generation amount of deviation in variation of scanning-line curves between two stations ST1, ST2, and to reduce color misregistration in an output image.

Figure 32:
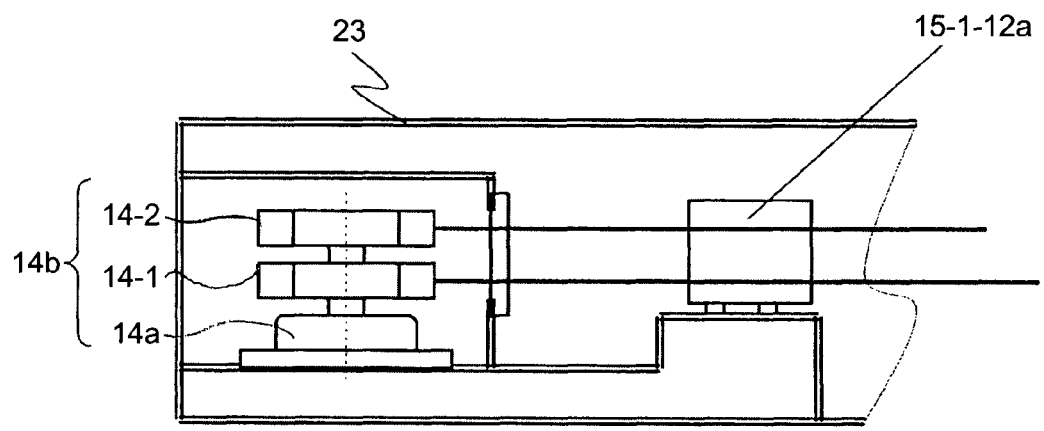
FIG. 32 is a schematic diagram of relevant parts of an tenth example of an image forming apparatus.

Part of a bicolor image forming apparatus (color image forming apparatus) of a tenth example is shown in FIG. 32. In the structure of the tenth example (FIG. 32), curvatures in the sub-scanning direction of the optical surface (incident side and exit side) of the first scanning lens 15-1-12*a* are set at zero (radius of curvature is 8). However, curvature of either one side may be set at zero. According to this structure, the effects of the tenth example (FIG. 31) and the seventh example (FIG. 25) can be obtained concurrently.

In the bicolor image forming apparatus (color image forming apparatus) of FIG. 31, as the three disposing positions of bosses provided in the first scanning lens 15-1-12, the two bosses provided on both sides of the main scanning direction may be disposed outside the main scanning direction of the effective area regarding optical scanning. As a result, it is possible to reduce generation amount of deviation in scanning-line shape between the upper stage side and the lower stage side of the first scanning lens 15-1-12, and to reduce occurrence of change in scanning-line shape in the image area as in the case of the eighth example.

Likewise the structures of the seventh example (FIG. 25) and the tenth example (FIG. 32), it is preferred to implement the lens that is optically closest to the polygon scanner 14*b* which is a heat source, by the scanning lens (15-1-1*a*, 15-1-2*a*, 15-1-12*a*) having curvature in the sub-scanning direction of zero. For example, in FIG. 25 (FIG. 14), in a group of first scanning lenses 15-1-1*a* and second scanning lens 15-2-1 corresponding to the light beam from the polygon mirror 14-1, the first scanning lens 15-1-1*a* is the lens that is optically closest to the polygon scanner 14*b*. The expression "optically closest" means that the distance along the optical path of the laser beam is smallest.

With such structure, color misregistration (in the sub-scanning direction) caused by heat generation of the polygon scanner described in the tenth and thirteenth examples can be reduced. Additionally, since the first scanning lens which is closer to polygon scanner 14*b* (15-1-1*a* and 15-1-2*a* in FIG. 25) does not have power (refracting power) in the sub-scanning direction, the second scanning lens (15-2-1 and 15-2-2) on the side of the photoconductor (target surface) has positive strong power in the sub-scanning direction, so that imaging magnification in the sub-scanning direction of the scanning optical system decreases, leading the advantages that deterioration of performance due to mounting error of parts, shape error and the like can be prevented, and small-diameter beam spot can be realized, and change in magnification according to image height can be easily corrected. As a result, high quality of output image can be realized.

Further, in the seventh example and the tenth example, it is preferred to construct mechanical layout of the optical housing member (mechanical design aspect) so that the physical distance along the optical housing member (distance of heat conduction in the optical housing member) from the polygon scanner to the first scanning lens is shortest, as well as to dispose the first scanning lens having curvature in the sub-scanning direction of zero at the position which is optically closest to the polygon scanner which is a heat source (optical design aspect).

Figure 33:
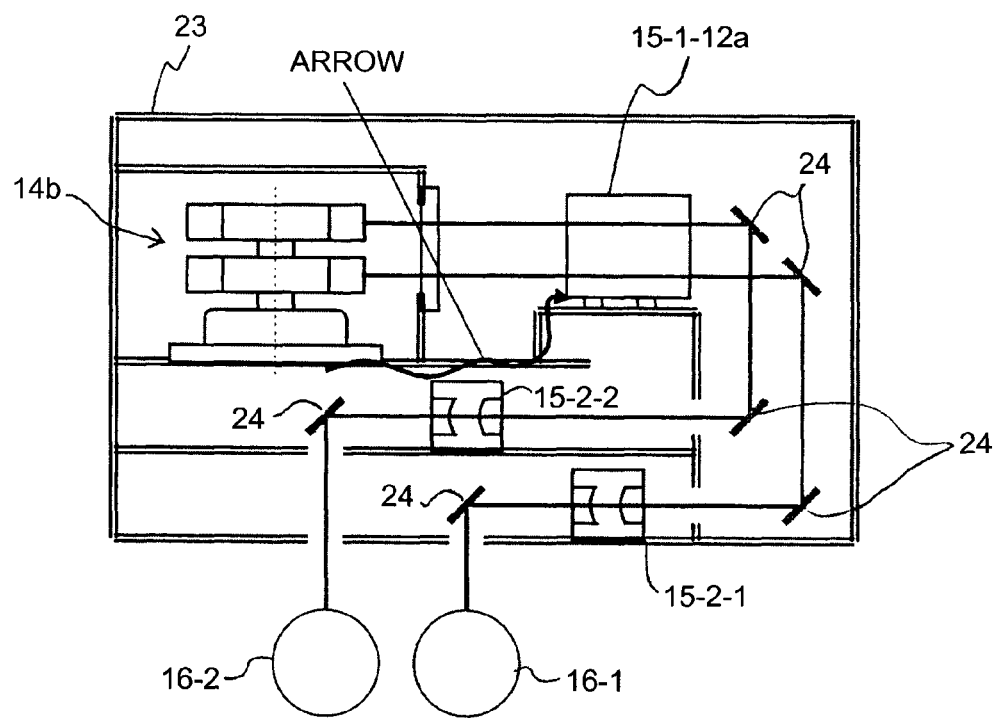
FIG. 33 is a schematic diagram of an eleventh example of an image forming apparatus.
Figure 34:
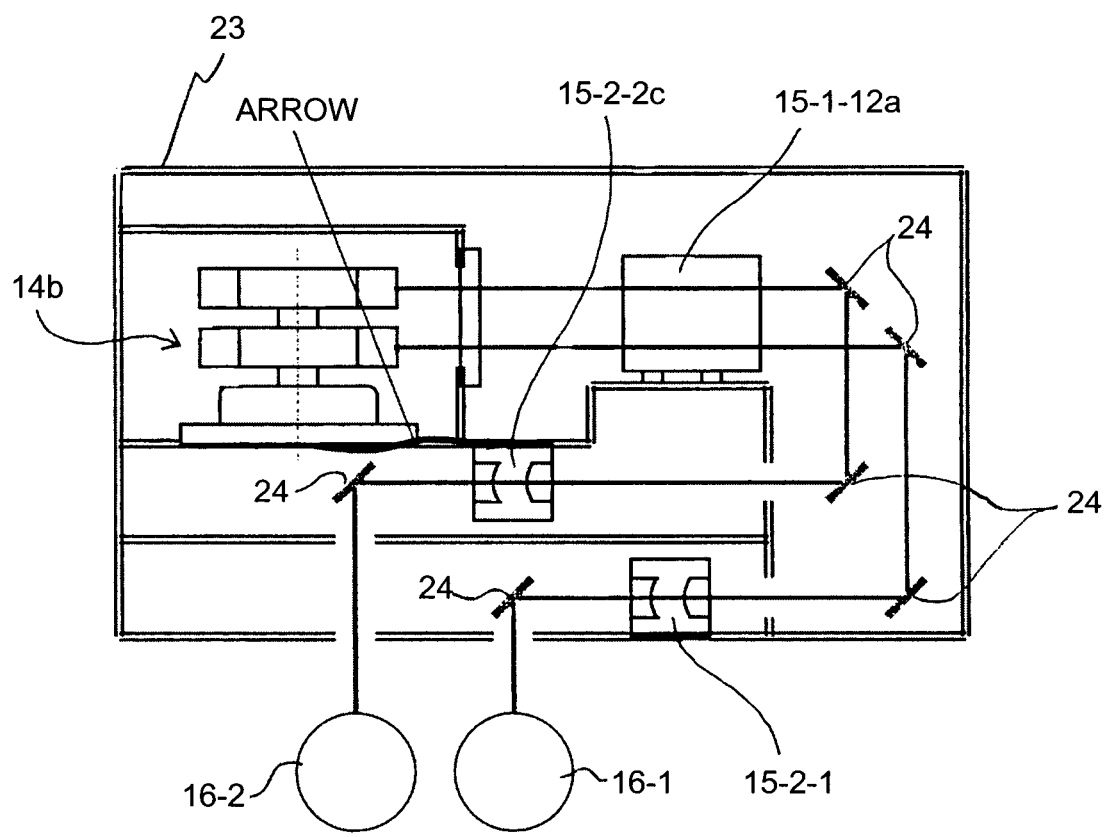
FIG. 34 is a schematic diagram of a comparative example for the image forming apparatus shown in FIG. 33.

As such a structure of an eleventh example based on the structure of the tenth example is explained. FIG. 33 is a structural view depicting a structure of a bicolor image forming apparatus (color image forming apparatus) of the eleventh example. A comparative example of the eleventh example is shown in FIG. 34. In the case of the comparative example shown in FIG. 34, heat generated at the polygon scanner 14*b* transmits through the optical housing member, and reaches the second scanning lens 15-2-2*c* which is mounted on the back side of the polygon scanner 14*b* mounting surface as indicated by the arrow. Since distance D2 from the polygon scanner 14*b* to the second scanning lens 15-2-12*c* is smaller than distance D1 from the polygon scanner 14*b* to the first scanning lens 15-1-12*a*, the second scanning lens 15-2-12*c* is influenced by heat generation at the polygon scanner 14*b* more strongly. Since the curvature in the sub-scanning direction of the first scanning lens 15-1-12*a* is set at zero (in terms of optical design), and the power in the sub-scanning direction is concentrated to the side of the second scanning lens 15-2-2-2*c*, influence of heat generation of the polygon scanner 14*b* is more likely to be stronger.

On the other hand, in the case of the eleventh example shown in FIG. 33, since the mounting surface of the polygon scanner 14*b* and mounting surfaces of the second scanning lenses 15-2-1 and 15-2-2 are completely separated or sufficiently distanced from the first scanning lens 15-1-12*a* (distance D2 from the polygon scanner 14*b* to the second scanning lens 15-2-2 is longer than distance D1 from the polygon scanner 14*b* to the first scanning lens 15-1-12*a*), the amount of heat generated at the polygon scanner 14*b* and that transmits to the second scanning lenses 15-2-1 and 15-2-2 is very small. Heat generated at the polygon scanner 14*b* is transmitted to the first scanning lens 15-1-12*a*. However, as described above, since the power in the sub-scanning direction of the first scanning lens 15-1-12*a* is set at zero, influence exerted on the scanning-line shape is small, and this is a preferred structure.

As set forth hereinabove, according to an embodiment of the present invention, it is possible to reduce color misregistration as well as the amount of color misregistration. Thus, a high-quality image can be obtained.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a plurality of photoconductors;
   an exposing unit that exposes the photoconductors to light beams to form an electrostatic latent image on each of the photoconductors;
   a developing unit that visualizes the electrostatic latent image with at least two colors of toner, first and second toner colors having first and second visual sensitivities, respectively, the first visual sensitivity being lower than the second visual sensitivity;
   a transfer unit that transfers the visualized image onto a recording medium; and
   a fixing unit that fixes the visualized image on the recording medium,
   wherein the exposing unit includes
      a plurality of light sources that emit light beams,
      a deflector that rotates and deflects the light beams from the light sources, a scanning optical system that includes a plurality of focusing elements, and that scans the photoconductors with the light beams from the deflector, and a housing that houses therein the light sources, the deflector, and the scanning optical system, wherein the focusing elements include a first focusing-element group of at least two individual resin focusing members separated via a plurality of bosses that are distributed across a width of the individual resin focusing members as a positioning unit for height mounting references, at least one of the bosses being located within an effective area of the main scanning direction, and the at least two individual resin focusing members being aligned in a sub-scanning direction such that at least one of the two focusing members of the first focusing-element group is aligned with one of the light beams, wherein a first light beam corresponding to the first toner color passes through a first focusing member of the first focusing-element group, and wherein a second light beam corresponding to the second toner color passes through a second focusing member of the first focusing-element group, wherein the housing comprises resin, and includes a shielding member near the deflector so as to surround an entire circumference of the deflector such that the deflector is separated from the focusing elements by the shielding member to prevent heat generated along with rotation of the deflector from diffusing in the housing by air flow caused by rotation of the deflector, wherein the image forming apparatus further comprises:

a first heat transmission path that transmits heat generated along with rotation of the deflector, from the shielding member to a top surface of the first focusing member by natural convection, and a second heat transmission path that transmits the heat generated along with rotation of the deflector, from the shielding member to a bottom surface of the second focusing member by heat conduction through a housing member, and wherein the second focusing member is attached directly to the housing via a first set of bosses of the plurality of bosses and the first focusing member of the first focusing-element group is attached directly at an upper side of the second focusing member via a second set of bosses of the plurality of bosses when an orientation of the image forming apparatus is set as in a normal operation, so that an amount of heat transmitted by the first heat transmission path is larger than an amount of heat transmitted by the second heat transmission path.

2. The image forming apparatus according to claim 1, further comprising at least one folding mirror between the deflector and the photoconductors to fold an optical path of the light beams, wherein the at least one folding mirror and a surface of the at least two focusing members of the first focusing-element group abutting the housing are set such that a directional characteristic of a curve of the scanning line due to temperature change is identical between the photoconductors.

3. The image forming apparatus according to claim 1, further comprising a cover on one side of the first focusing-element group to prevent heat conduction due to air flow.

4. The image forming apparatus according to claim 3, wherein the cover includes a spring that generates spring force to secure the first focusing-element group to the housing.

5. The image forming apparatus according to claim 1, wherein the first focusing-element group is secured to the housing under spring force in at least the sub-scanning direction.

6. The image forming apparatus according to claim 1, wherein the at least two focusing members of the first focusing-element group have an incident surface and an exit surface, at least one of which does not refract light in the sub-scanning direction.

7. The image forming apparatus according to claim 6, wherein the focusing elements include a second focusing-element group of focusing elements each corresponding to one of the light beams, and wherein the first focusing-element group is located optically closer to the deflector than is the second focusing-element group.

8. The image forming apparatus according to claim 7, wherein the at least two focusing members are optical element lenses arranged along an optical path from the deflector to the photoconductors, the optical element lenses including an optical element lens L1 located optically closest to the deflector, and an optical element lens Li located optically i-th closest to the deflector, and wherein a physical distance D1 from the deflector to the optical element lens L1 along the housing satisfies D1<Di where Di is a physical distance from the deflector to the optical element lens Li.

9. The image forming apparatus according to claim 1, wherein one of the at least two focusing members of the first focusing-element group abuts the housing through a plurality of abutting portions arranged in a main scanning direction, and wherein at least two of the abutting portions are located outside, in the main scanning direction, an effective area of the one of the at least two focusing members where the light beams pass, the effective area corresponding to an imaging area of each of the photoconductors.

10. The image forming apparatus according to claim 1, wherein a portion of the shielding member enclosing the deflector is soundproof glass, through which the light beams pass.

11. An image forming apparatus comprising:

a plurality of photoconductors;

an exposing unit that exposes the photoconductors to light beams to form an electrostatic latent image on each of the photoconductors;

a developing unit that visualizes the electrostatic latent image with at least two colors of toner, first and second toner colors having first and second visual sensitivities, respectively, the first visual sensitivity being lower than the second visual sensitivity;

a transfer unit that transfers the visualized image onto a recording medium; and a fixing unit that fixes the visualized image on the recording medium, wherein the exposing unit includes a plurality of light sources that emit light beams, a deflector that rotates and deflects the light beams from the light sources, a scanning optical system that includes a plurality of focusing elements, and that scans the photoconductors with the light beams from the deflector, and a housing that houses therein the light sources, the deflector, and the scanning optical system, wherein the focusing elements include a first focusing-element group of at least two individual resin focusing members separated via a plurality of bosses that are distributed across a width of the individual resin focusing members as a positioning unit for height mounting references, at least one of the bosses being located within an effective area of the main scanning direction, and the at least two individual resin focusing members being aligned in a sub-scanning direction such that at least one of the two focusing members of the first focusing-element group is aligned with one of the light beams, wherein a first light beam corresponding to the first toner color passes through a first focusing member of the first focusing-element group, wherein a second light beam corresponding to the second toner color passes through a second focusing member of the first focusing-element group, wherein the housing includes metal, and includes a shielding member near the deflector so as to surround an entire circumference of the deflector such that the deflector is separated from the focusing elements by the shielding member to prevent heat generated along with rotation of the deflector from diffusing in the housing by air flow caused by rotation of the deflector, wherein the image forming apparatus further comprises:
a first heat transmission path that transmits heat generated along with rotation of the deflector, from the shielding member to a top surface of the second focusing member by natural convection, and
a second heat transmission path that transmits the heat generated along with rotation of the deflector, from the shielding member to a bottom surface of the first focusing member by heat conduction through a housing member, and wherein the first focusing member of the first focusing-element group is attached directly to the housing via a first set of bosses of the plurality of bosses and the first focusing member is attached directly at a lower side of the second focusing member via a second set of bosses of the plurality of bosses when an orientation of the image forming apparatus is set as in a normal operation, so that an amount of heat transmitted by the second heat transmission path is larger than an amount of heat transmitted by the first heat transmission path.

12. The image forming apparatus according to claim 11, further comprising a heat insulating member between the housing and the first focusing-element group that satisfies $H/\kappa > 0.008$ where $H$ [m] is thickness of the heat insulating member, and $\kappa$ [W/(m*K)] is heat conductivity of the heat insulating member.

13. The image forming apparatus according to claim 11, further comprising at least one folding mirror between the deflector and the photoconductors to fold an optical path of the light beams,
wherein the at least one folding mirror and a surface of the at least two focusing members of the first focusing-element group abutting the housing are set such that a directional characteristic of a curve of the scanning line due to temperature change is identical between the photoconductors.

14. The image forming apparatus according to claim 11, further comprising a cover on one side of the first focusing-element group to prevent heat conduction due to air flow.

15. The image forming apparatus according to claim 11, wherein the first focusing-element group is secured to the housing under spring force in at least the sub-scanning direction.

16. The image forming apparatus according to claim 11, wherein the at least two focusing members of the first focusing-element group have an incident surface and an exit surface, at least one of which does not refract light in the sub-scanning direction.

17. The image forming apparatus according to claim 11, wherein one of the at least two focusing members of the first focusing-element group abuts the housing through a plurality of abutting portions arranged in a main scanning direction, and
wherein at least two of the abutting portions are located outside, in the main scanning direction, an effective area of the one of the at least two focusing members where the light beams pass, the effective area corresponding to an imaging area of each of the photoconductors.

18. The image forming apparatus according to claim 11, wherein a portion of the shielding member enclosing the deflector is soundproof glass, through which the light beams pass.

* * * * *